(12) United States Patent
Yamada et al.

(10) Patent No.: US 7,710,242 B2
(45) Date of Patent: May 4, 2010

(54) INFORMATION ACCESS SYSTEM AND ACTIVE-TYPE CONTACTLESS INFORMATION STORAGE DEVICE

(75) Inventors: Isamu Yamada, Kawasaki (JP);
Shinichi Shiotsu, Kawasaki (JP);
Satoshi Inano, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 11/700,216

(22) Filed: Jan. 31, 2007

(65) Prior Publication Data
US 2008/0079549 A1    Apr. 3, 2008

(30) Foreign Application Priority Data
Sep. 26, 2006  (JP)  ............... 2006-261557

(51) Int. Cl.
*H04Q 5/22* (2006.01)
*G08B 13/14* (2006.01)
(52) U.S. Cl. .................. 340/10.51; 340/10.1; 340/10.5; 340/572.1
(58) Field of Classification Search ... 340/572.1–572.9, 340/10.1–10.6, 3.1–3.9, 5.61–5.63; 235/375–385; 455/41.1–41.3; 370/314; 709/208–211, 709/203
See application file for complete search history.

(56) References Cited

U.S. PATENT DOCUMENTS

| 6,922,402 B1 | 7/2005 | Ko |
| 7,145,458 B2 | 12/2006 | Hashimoto et al. |
| 2004/0257204 A1* | 12/2004 | Liao et al. .................. 340/10.2 |
| 2006/0157562 A1* | 7/2006 | Desjeux ...................... 235/382 |
| 2008/0005259 A1* | 1/2008 | Inano et al. .................. 709/212 |

FOREIGN PATENT DOCUMENTS

| JP | 10-187898 A | 7/1998 |
| JP | 2000-113130 A | 4/2000 |
| JP | 2001-251210 A | 9/2001 |
| JP | 2006-23962 A | 1/2006 |
| WO | WO 97/43740 A | 11/1997 |
| WO | WO 2004/036482 A2 | 4/2004 |

* cited by examiner

*Primary Examiner*—Benjamin C Lee
*Assistant Examiner*—Michael Shannon
(74) *Attorney, Agent, or Firm*—Fujitsu Patent Center

(57) ABSTRACT

A contactless information storage device for use in an information access system includes a receiver unit and a transmitter unit. The receiver unit is operable to sense a carrier at a first frequency in a slave mode and be continuously ready to receive an RF signal at a second frequency different from the first frequency in a master mode. In the slave mode, the transmitter unit transmits a response signal at the second frequency in response to reception of an information request signal. In the master mode, the transmitter unit cyclically transmits an information request signal at the first frequency in a transmission period and goes into an inactive state in a sleep period. In the slave mode, the transmitter unit and the receiver unit are caused to go into the master mode, when the receiver unit receives no information request signal in a time period longer than given periods.

15 Claims, 23 Drawing Sheets

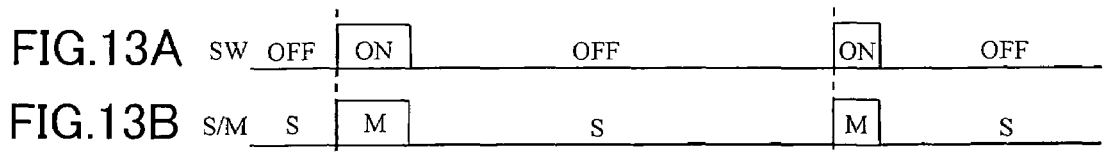
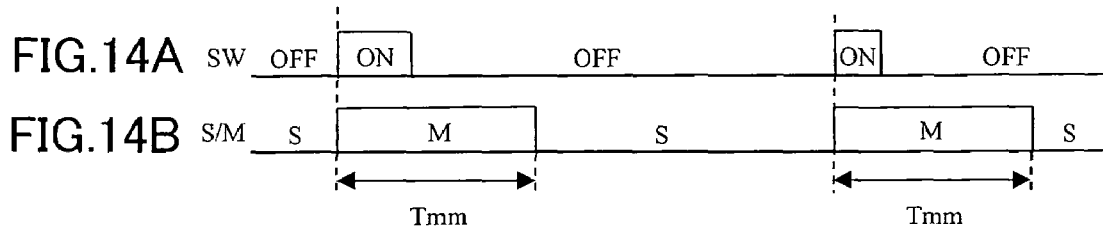
PRIORITIES IN MASTER/SLAVE OPERATIONS
| DEVICE | PC | NAME TAG | MOBILE PHONE | ... | OTHER J | OTHER K |
|---|---|---|---|---|---|---|
| PRIORITY | 0 | 1 | 2 | ... | 9 | 10 |
DEVICE WITH PRIORITY = 0 OPERATES ALWAYS AS MASTER
DEVICE WITH PRIORITY = 1-9 OPERATES AS SLAVE/MASTER
DEVICE WITH PRIORITY = 10 OPERATES ALWAYS AS SLAVE
FIG. 15

| | PRESENCE | | | INITIAL MODES | | | SUBSEQUENT MODES |
|---|---|---|---|---|---|---|---|
| | PC | NAME TAG | MOBILE PHONE | PC | NAME TAG | MOBILE PHONE | |
| PRIORITY | 0 | 1 | 2 | 0 | 1 | 2 | |
| 1.1 | PRESENT | PRESENT | PRESENT | M0 | S1 | S2 | MAINTAIN INITIAL MODES |
| 1.2 | DISAPPEAR | PRESENT | PRESENT | - | S1 | S2 | MODE CHANGE: S1⇒(M1, S1) |
| 1.3 | PRESENT | DISAPPEAR | PRESENT | M0 | - | S2 | MAINTAIN INITIAL MODES |
| 1.4 | PRESENT | PRESENT | DISAPPEAR | M0 | S1 | - | MAINTAIN INITIAL MODES |
| 1.5 | PRESENT | DISAPPEAR | DISAPPEAR | M0 | - | - | M0 MAINTAINS MASTER MODE |
| 1.6 | DISAPPEAR | PRESENT | DISAPPEAR | - | S1 | - | MODE CHANGE: S1⇒(M1, S1) |
| 1.7 | DISAPPEAR | DISAPPEAR | PRESENT | - | - | S2 | MODE CHANGE: S2⇒(M2, S2) |

FIG. 16

| | PRESENCE | | | INITIAL MODES | | | SUBSEQUENT MODES |
|---|---|---|---|---|---|---|---|
| | PC | NAME TAG | MOBILE PHONE | PC | NAME TAG | MOBILE PHONE | |
| PRIORITY | 0 | 1 | 2 | 0 | 1 | 2 | |
| 2.1 | PRESENT | PRESENT | PRESENT | M0 | S1 | S2 | MAINTAIN INITIAL MODES |
| 2.2 | APPEAR | PRESENT | PRESENT | [M0] | (M1,S1) | S2 | MODE CHANGE: (M1, S1) ⇒ S1 |
| 2.3 | PRESENT | APPEAR | PRESENT | M0 | [S1] | S2 | S1 JOINS |
| 2.4 | PRESENT | PRESENT | APPEAR | M0 | S1 | [S2] | S2 JOINS |
| 2.5 | PRESENT | APPEAR | APPEAR | M0 | [S1] | [S2] | S1 & S2 JOIN |
| 2.6 | APPEAR | PRESENT | APPEAR | [M0] | (M1,S1) | [S2] | MODE CHANGE: (M1, S1) ⇒ S1 |
| 2.7 | APPEAR | APPEAR | PRESENT | [M0] | [S1] | (M2,S2) | MODE CHANGE: (M2, S2) ⇒ S2 |

FIG. 17

| PRIORITY | PRESENCE | | | INITIAL MODES | | | SUBSEQUENT MODES |
|---|---|---|---|---|---|---|---|
| | PC | NAME TAG | MOBILE PHONE | PC | NAME TAG | MOBILE PHONE | |
| | 0 | 1 | 10 | 0 | 1 | 10 | |
| 3.1 | PRESENT | PRESENT | PRESENT | M0 | S1 | S10 | MAINTAIN INITIAL MODES |
| 3.2 | DISAPPEAR | PRESENT | PRESENT | - | S1 | S10 | MODE CHANGE: S1⇒(M1, S1) |
| 3.3 | PRESENT | DISAPPEAR | PRESENT | M0 | - | S10 | MAINTAIN INITIAL MODES |
| 3.4 | PRESENT | PRESENT | DISAPPEAR | M0 | S1 | - | MAINTAIN INITIAL MODES |
| 3.5 | PRESENT | DISAPPEAR | DISAPPEAR | M0 | - | - | M0 MAINTAINS MASTER MODE |
| 3.6 | DISAPPEAR | PRESENT | DISAPPEAR | - | S1 | - | MODE CHANGE: S1⇒(M1, S1) |
| 3.7 | DISAPPEAR | DISAPPEAR | PRESENT | - | - | S10 | S10 MAINTAINS SLAVE MODE |

FIG. 18

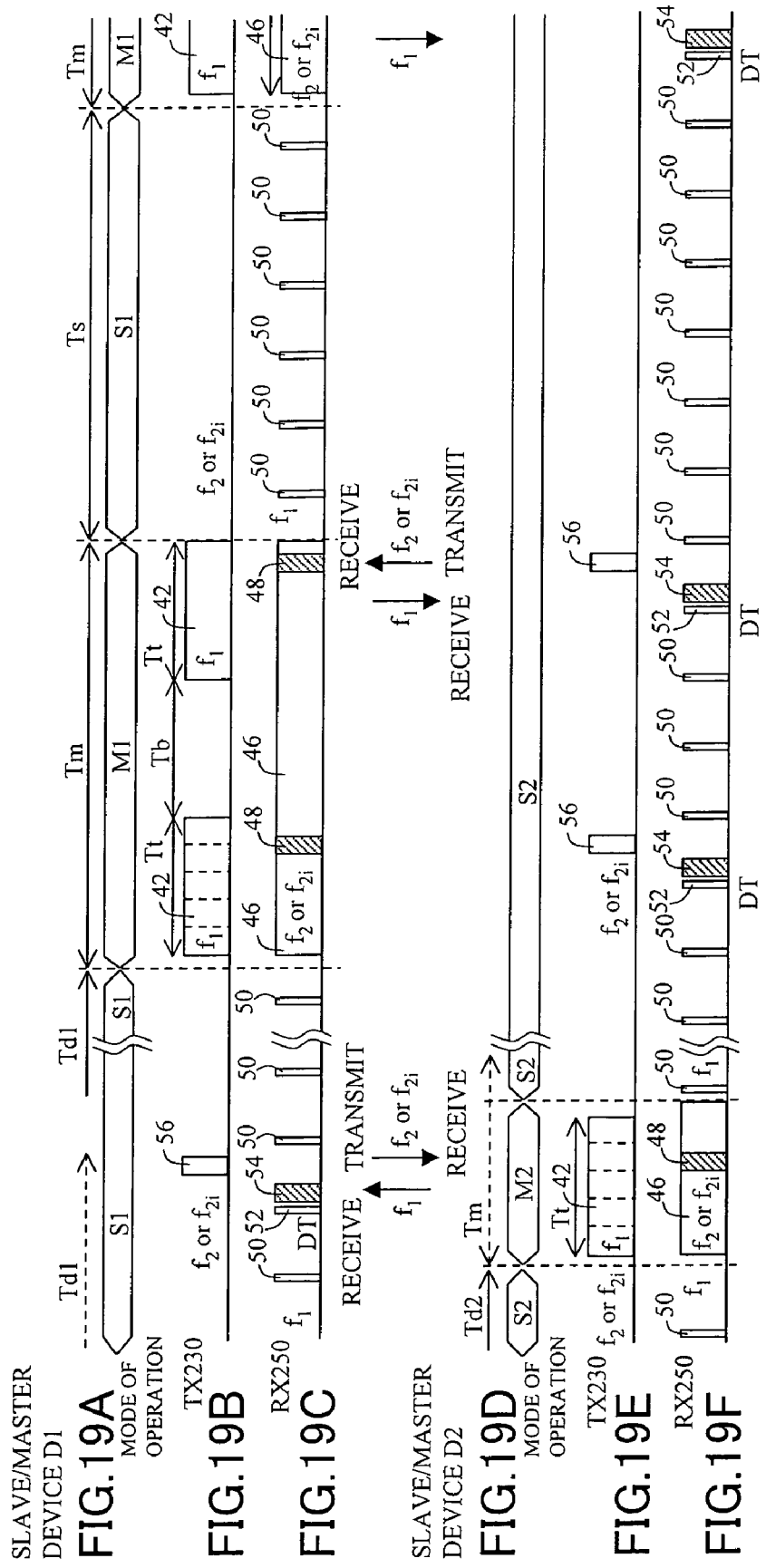

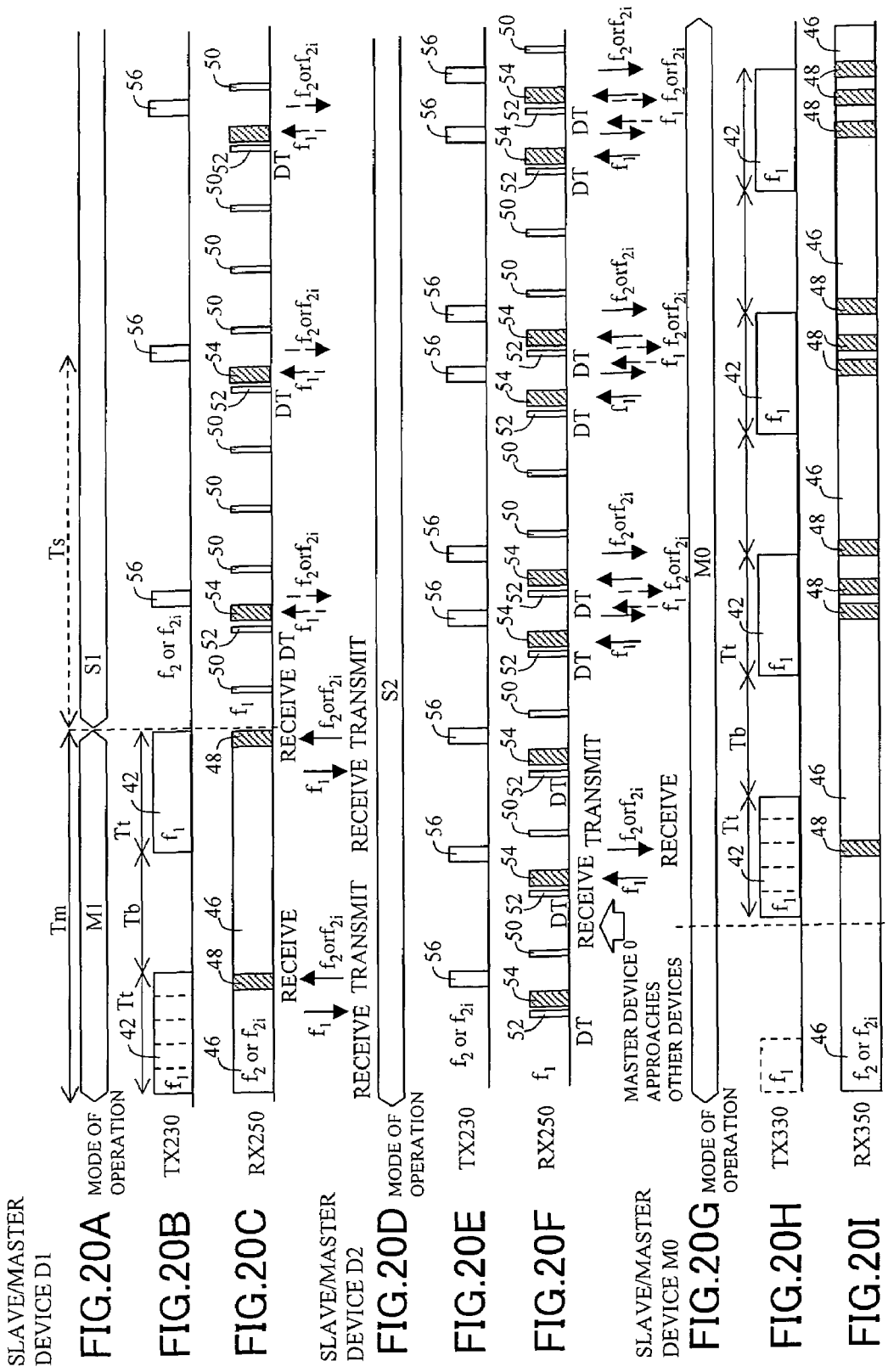

MASTER DEVICE

SLAVE DEVICE

| STATE | CONDITIONS | SUBSEQUENT STATE | ALARM | MODE |
|---|---|---|---|---|
| ST0 | - COND. 1: It is slave, and detects another master with a higher priority in vicinity.<br>- COND. 2: COND. 1 is not satisfied. | •ST0<br>•ST1 | ALARM 1 | Si |
| ST1 | - COND. 3: It is within period Td after COND. 2 has been satisfied.<br>- COND. 4a: It detecs another M with higher priority.<br>- COND. 4b: When it detects another M with same priority, it extends period Td.<br>- COND. 5: Until period Td has elapses after COND. 2 has been satisfied, it detects no other M with higher or same priority. | •ST1<br>•ST0<br>•ST1<br>•ST2 | ALARM 2 | Si |
| ST2 | - COND. 6: It is within period Tm after COND. 5 has been satisfied.<br>- COND. 7: Period Tm has epalsed since COND. 5 was satisfied.<br>- COND. 8: It detects another S with higher or same priority. | •ST2<br>•ST3<br>•ST0 | | Mi |
| ST3 | - COND. 9: It is within period Ts after COND. 7 has been satisfied.<br>- COND. 10: It detects no other M with higher or same priority until period Ts elapses.<br>- COND. 11: It detects another M with higher or same priority before period Ts elapses. | •ST3<br>•ST2<br>•ST0 | ALARM 3 | Si |

FIG. 23

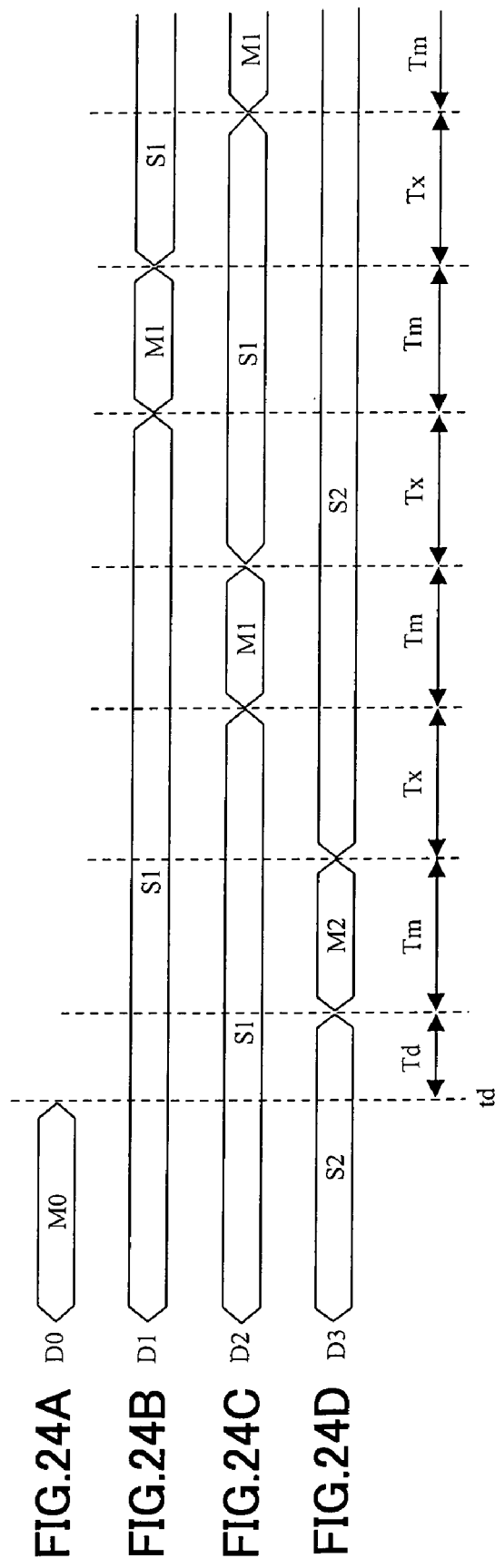

INFORMATION ACCESS SYSTEM AND ACTIVE-TYPE CONTACTLESS INFORMATION STORAGE DEVICE

FIELD OF THE INVENTION

The present invention relates generally to an active-type contactless information storage device, which a reader/writer device can read and write information from and into in a contactless manner, and in particular to an active RF ID tag capable of reading another active RF ID tag in a master mode of operation.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the motion of the person is monitored and managed. The active-type RF ID tag with battery power supply has a larger communication range than a passive-type RF ID tag that receives power from a reader/writer device in a contactless manner, and hence the active-type RF ID tag is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97/43740 published on Nov. 20, 1997 describes radio frequencies identification device which includes an integrated circuit including a receiver, a transmitter and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much larger range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 describes a method of locking a frequency in a transmitter at each of two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the first transmitter is detected as the offset of a second corresponding receiver. The second receiver shifts the carrier frequency of the second transmitter, in response to the detected offset, to inform the first transmitter about the detected offset. The first receiver uses the detected offset to correct the carrier frequency of the first transmitter.

Japanese Patent Application Publication JP HEI 10-187898-A published on Jul. 21, 1998 describes an IC card. This IC card transmits and receives data to and from another IC card via an information processing apparatus, to which the IC card may be attached. The IC card has a status setting means for determining the mode identification information from the transmitting data and setting its own operating state in an operation mode that is set by the opposite party, and a mode information transmitting means for selecting the mode information out of a mode information table and adds it to the transmitting data. Then the mode information added by the means is transmitted as the mode identification information together with the transmitting data in a command column or a response column of a transmission mode when the master/slave relation is set or changed. Thus data can be transferred mainly on an IC card and various processing functions can be added to the IC card.

PCT International Publication WO 2004/036482 published on Apr. 29, 2004 describes a system and a method for minimizing the unwanted re-negotiation of passive RF ID tags. Each RF ID tag stores a confirmed read flag to indicate whether that RF ID tag has been previously read. During subsequent interrogations of the tag population, a reader has capability to address all RF ID tags in a tag population or to address only unread RF ID tags. When addressing all RF ID tags, the reader sends a symbol causing all RF ID tags to ignore their confirmed read flag value. Each RF ID tag may also clear its confirmed read flag when this symbol is received. When addressing only unread RF ID tags, the reader sends a symbol causing each RF ID tag to evaluate its confirmed read flag value. Those RF ID tags that have a confirmed read flag value indicating "read" will enter dormant state and will not be re-negotiated. Those RF ID tags that have a confirmed read flag value indicating "not read" will continue to communicate with the reader.

Japanese Patent Application Publication JP 2006-23962-A published on Jan. 26, 2006 describes a contactless IC tag system. In this system, a plurality of IC tags are classified into a master IC tag and slave IC tags. A memory configuration management area in a memory of the master IC tag stores memory configuration information (identification information, a memory head address and a memory byte number of each the IC tag) of the master IC tag itself and the slave IC tags. A reader/writer specifies the master IC tag and handles a group of the IC tags. Thus, large data can be handled efficiently, using a mass-produced low-cost non-contact IC tag having small memory capacity.

SUMMARY OF THE INVENTION

In accordance with an aspect of the present invention, an information access system for accessing information stored in a contactless information storage device includes, a first active-type contactless information storage device, a reader/writer device, and a second active contactless information storage device. The first active-type contactless information storage device includes a first memory, a first control unit, a first receiver unit adapted to sense a carrier of an RF signal at a first frequency for detection in a slave mode of operation and to be continuously ready to receive an RF signal at a second frequency different from the first frequency in a master mode of operation, and a first transmitter unit for transmitting a response signal at the second frequency in response to reception of an information request signal in the slave mode of operation and for cyclically transmitting an information request signal at the first frequency in a transmission period and then going into an inactive state in a sleep period in the master mode of operation, under the control of the first control unit. The reader/writer device operates as a master and includes a second memory, a second control unit, a second transmitter unit for cyclically transmitting an information request signal at the first frequency in a transmission period and then going into an inactive state in a sleep period, under the control of the second control unit, and a second receiver unit adapted to be continuously ready to receive an RF signal at the second frequency. The second active-type contactless information storage device includes a third memory, a third control unit, a third receiver unit adapted to sense a carrier of an RF signal at the first frequency for detection in a slave mode of operation, and a third transmitter unit for transmitting a response signal at the second frequency in response to receipt of an information request signal in a slave mode of operation. In the slave mode of operation, the first control unit of the first information storage device controls the first receiver unit to sense a carrier of an RF signal at the first frequency in predetermined periods occurring in a predetermined cycle which is shorter than each of the transmission period and the sleep period. In the slave mode of operation, when the first receiver unit senses and detects a carrier of an RF signal at the first frequency in a particular predetermined period, the first control unit causes the first receiver unit to further receive an information request signal. In the slave mode of operation, the first control unit causes the first transmitter unit to transmit a response signal at the second frequency that carries information stored in the first memory in response to the information request signal. In the slave mode of operation, in carrier sensing, the first control unit causes the first receiver unit to be in an active state and the first transmitter unit to be in an inactive state in the particular predetermined period. In the slave mode of operation, when the first receiver unit attempts to sense a carrier of an RF signal at the first frequency in the particular predetermined period but detects no carrier, the first control unit controls the first receiver unit and the first transmitter unit to remain in an inactive state in a non-carrier-sensing period between the particular predetermined period for carrier sensing and the predetermined period for subsequent carrier sensing. In the slave mode of operation, the first control unit causes the first transmitter unit and the first receiver unit to go into the master mode of operation, when the first receiver unit receives no information request signal in a first period of time longer than a plurality of the predetermined periods.

The invention also relates to an active contactless information storage device for use in the information access system described above.

The invention also relates to an electronic device and an article having such an active contactless information storage device.

BRIEF DESCRIPTION OF THE DRAWINGS

FIGS. 13A and 13B show a time chart of a temporal change of the operation mode of the slave/master device from a slave mode of operation S to a master mode of operation M, in response to a user's operation of press a key switch in FIG. 10;

FIGS. 14A and 14B show another time chart of a temporal change of the operation mode of the slave/master device from a slave mode of operation S to a master mode of operation M for a predetermined period of time, in response to a user's operation of pressing the key switch in FIG. 10;

FIG. 15 shows an example of a table showing the priorities of the master/slave (M/S) of different devices;

FIG. 16 shows conditional operations of ones or one of three devices, when any other one or ones of the three devices move away and disappear after the three devices have been located within the mutual communication ranges in the initial state;

FIG. 17 shows conditional operations of the three devices, when any one or ones of the three devices appear within the mutual communication ranges and participate in the communication among them, after the other one or ones of the three devices have been located possibly within the mutual communication ranges in communication with each other in the initial state;

FIG. 18 shows further conditional operations of one or ones of the three devices, when any other one or ones of the three devices move away and disappear after the three devices have been located within the mutual communication ranges in the initial state;

FIGS. 19A-19F show time charts of the operations of two slave/master devices with different priorities located within the mutual communication ranges;

FIGS. 20A-20I show time charts of the operations of two slave/master devices with different priorities located within the mutual communication ranges and of a master device with the highest priority and appearing later within the communication ranges of the devices;

FIG. 23 shows the definitions of states in FIG. 22; and

FIGS. 24A-24D shows a time chart of the operation modes of a plurality of devices D0-D3, which includes two slave/master devices with the same priority located within the mutual communication ranges.

DESCRIPTION OF THE PREFERRED EMBODIMENTS

The known improved active RF ID tags that respond only to a tag ID request carried by an RF signal transmitted by a reader/writer device can perform communicate with each other via a reader/writer device, to thereby, for example, exchange information with each other or associate themselves with each other. However, once the reader/writer device moves away from them, the active RF ID tags cannot communicate with each other, and hence cannot exchange information with each other or associate themselves with each other.

The inventors have recognized that a particular active RF ID tag may be adapted to operate in a slave mode of operation when a reader/writer device is located near the RF ID tag, and adapted to operate in a master mode of operation when no reader/writer device is located near the RF ID tag, so that the particular active RF ID tag operates as if it were another reader/writer device operating in a master mode of operation relative to other active RF ID devices, and so that it can exchange information with the other active RF ID tags or associate itself with the other active RF ID tags and vice versa.

An object of the present invention is to allow a plurality of active contactless information storage devices to communicate directly with each other.

According to the invention, a plurality of active contactless information storage devices can communicate directly with each other via no reader/writer device.

Figure 1:
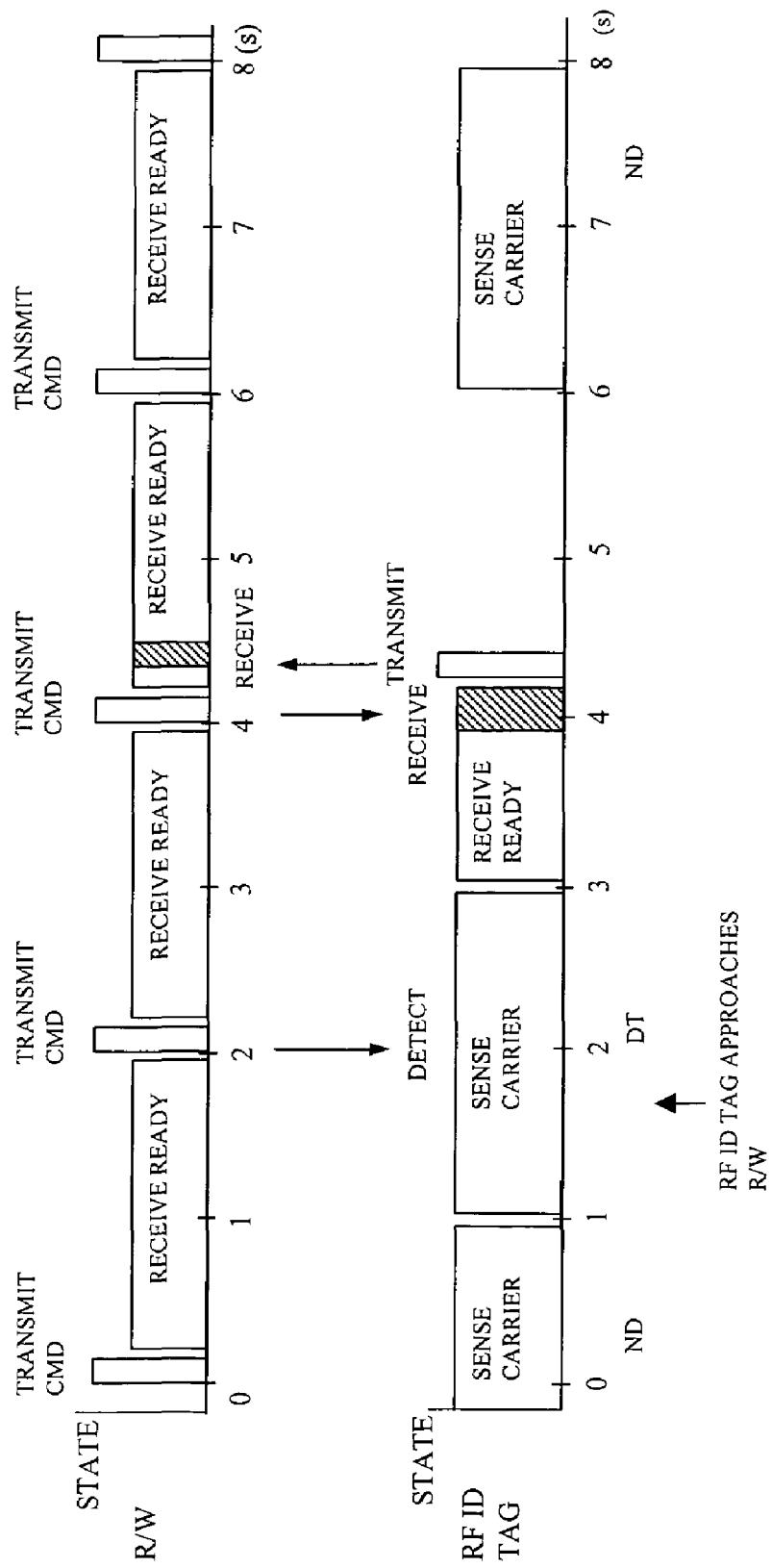
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of two (2) seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device in a randomly staggered time period in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two (2) seconds as an example, the carrier sensing duration also requires to have about two or more seconds in order to ensure the detection.

In general, when the RF ID tag receives no request from the reader/writer device, the RF ID tag is required to enter into a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

Figure 2:
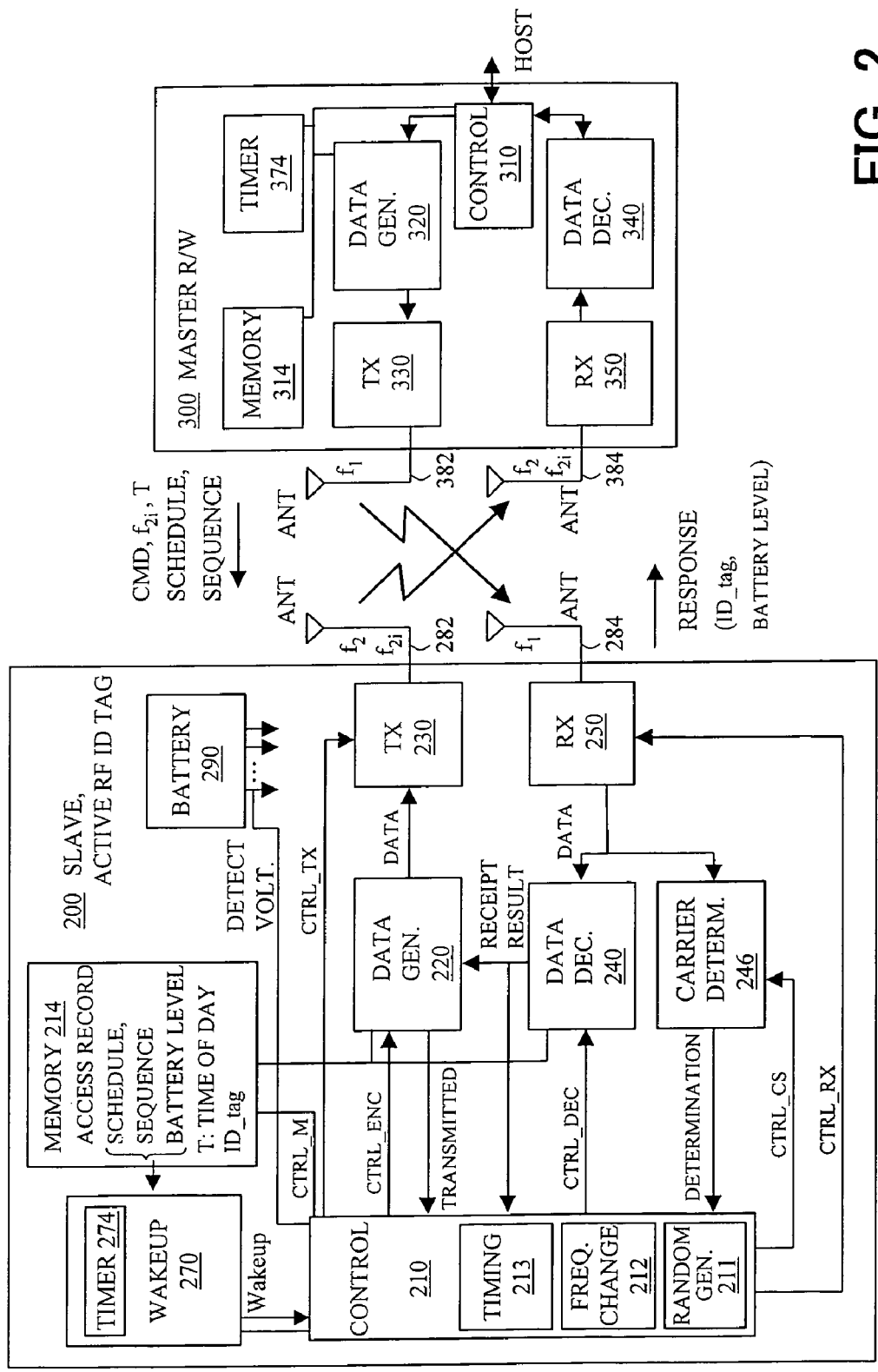
FIG. 2 shows the configurations of a further improved active-type RF ID tag as an active contactless information storage device and of a reader/writer device.

FIG. 2 shows the configurations of a further improved slave active-type RF ID tag 200 as an active contactless information storage device and of a master reader/writer device (R/W) 300. As an active contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, . . . , n); a receiver unit (RX) 250 for receiving and demodulating an RF signal at a frequency $f_1$, to thereby reproduce baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, ..., 305 MHz, for example. The transmission output power of the transmitter unit (TX) 230 may be 1 mW for example. Alternatively, the antennas 282 and 284 may be composed of a single antenna.

The control unit 210 includes a random number generator 211 for generating a random number for selecting a time slot for transmission, a frequency changing unit 212 for changing the transmitting frequency $f_{2i}$, and a timing unit 213 for adjusting a timing for transmission.

The control unit 210 is continuously in an active state after power activation, and provides a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program stored in the memory 214.

The memory 214 stores information such as, the tag ID (ID_tag) of the RF ID tag 200, the current time-of-day information T, records of accesses performed by the reader/writer device 300, a control schedule and a time control sequence of the wakeup unit 270, the current remaining power level of the battery 290, a cycle Tcs of sensing a carrier, a time period of processing for reception, a cycle of transmission, and a time period of transmission. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is continuously in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle Tcs for sensing a carrier, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data in a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data in a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband decoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID or information request command (referred to simply as a tag ID request command hereinafter) from the host computer, it provides data containing the command to the data generation unit 320. The data may contain: the transmission frequency $f_2$ or $f_{2i}$ to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated.

Figure 3:
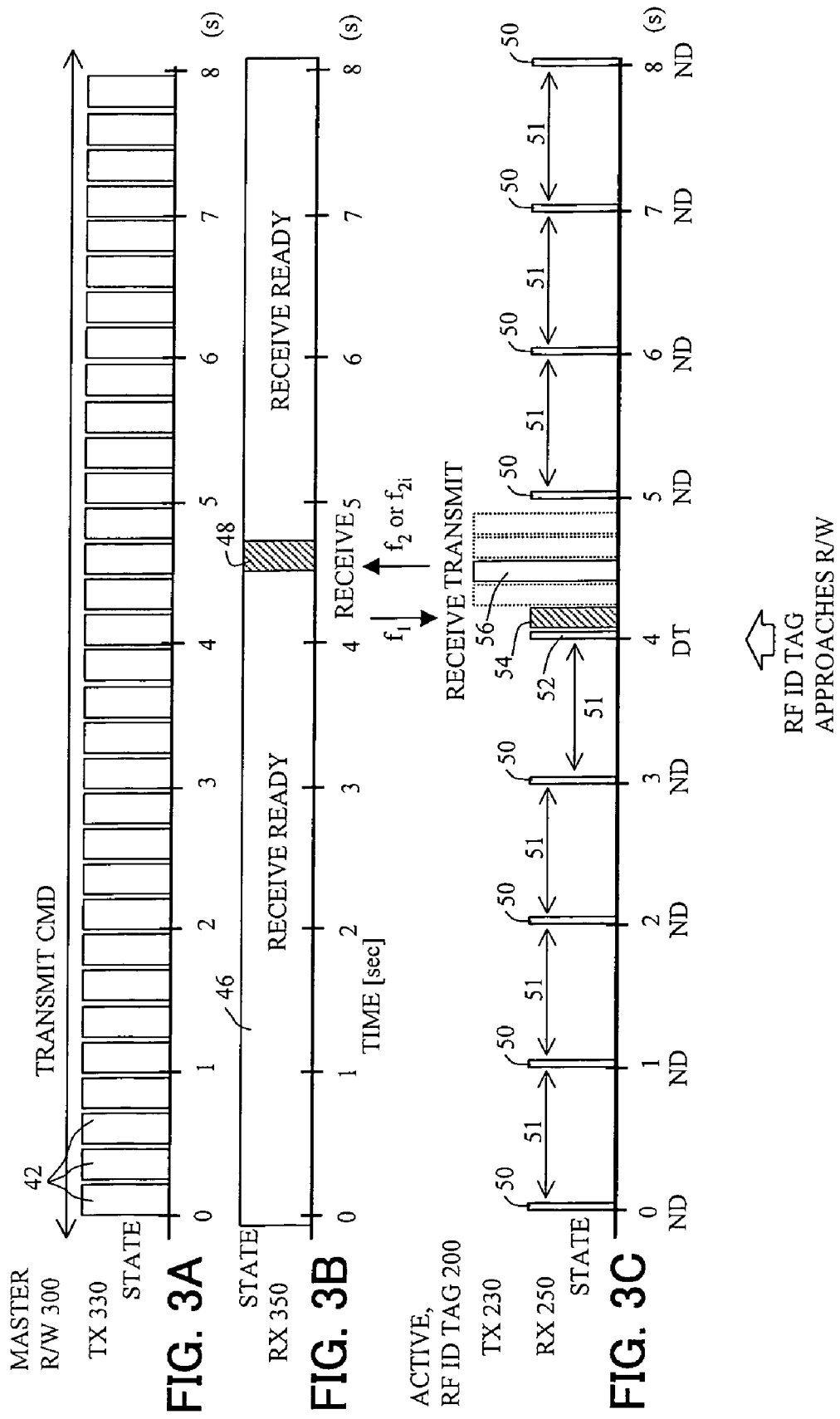
FIG. 3A shows a time chart of processing for transmission of an RF signal carrying a command transmitted by the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots cyclically at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle Tcs, for example of two seconds. This causes the receiver unit 250 to enter into a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters into a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal to thereby reproduce encoded data containing a command. The enabled data decoding unit 240 decodes the data in accordance with the predetermined encoding scheme, then obtains the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) and other required information retrieved from the memory 214, and then encodes the data in accordance with the predetermined encoding scheme. The other required information may include information, such as commodity contents of a package and the number of the contents, a sender, transportation, a route and a destination. The enabled transmitter unit 230 modulates the carrier with the response data containing the tag ID, and then transmits the RF signal.

Referring to FIG. 3B, the receiver unit 350 of the reader/writer device 300 is continuously in the receive ready state 46. When the RF ID tag 200 approaches the reader/writer device 300 and the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, the total time during which the RF ID tag 200 is not located near the reader/writer device 300 is significantly long. Thus, the active-type RF ID tag 200 is in a sleep mode of operation for the most time. This significantly reduces the power consumption of the active-type RF ID tag 200, and hence significantly increases the run time of the battery 290.

Figure 4:
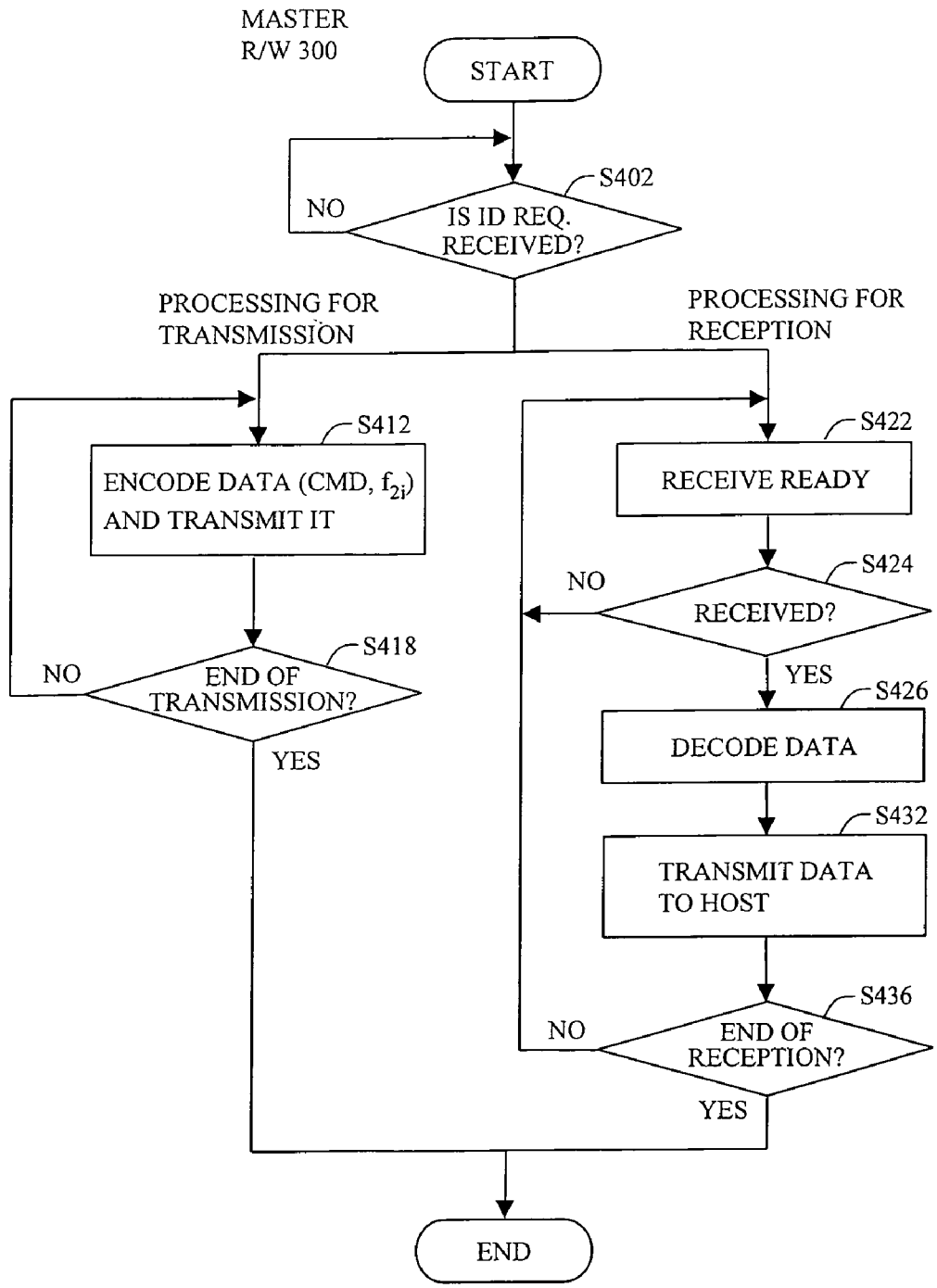
FIG. 4 shows a flow chart for the processing performed by the reader/writer device.
Figure 5A:
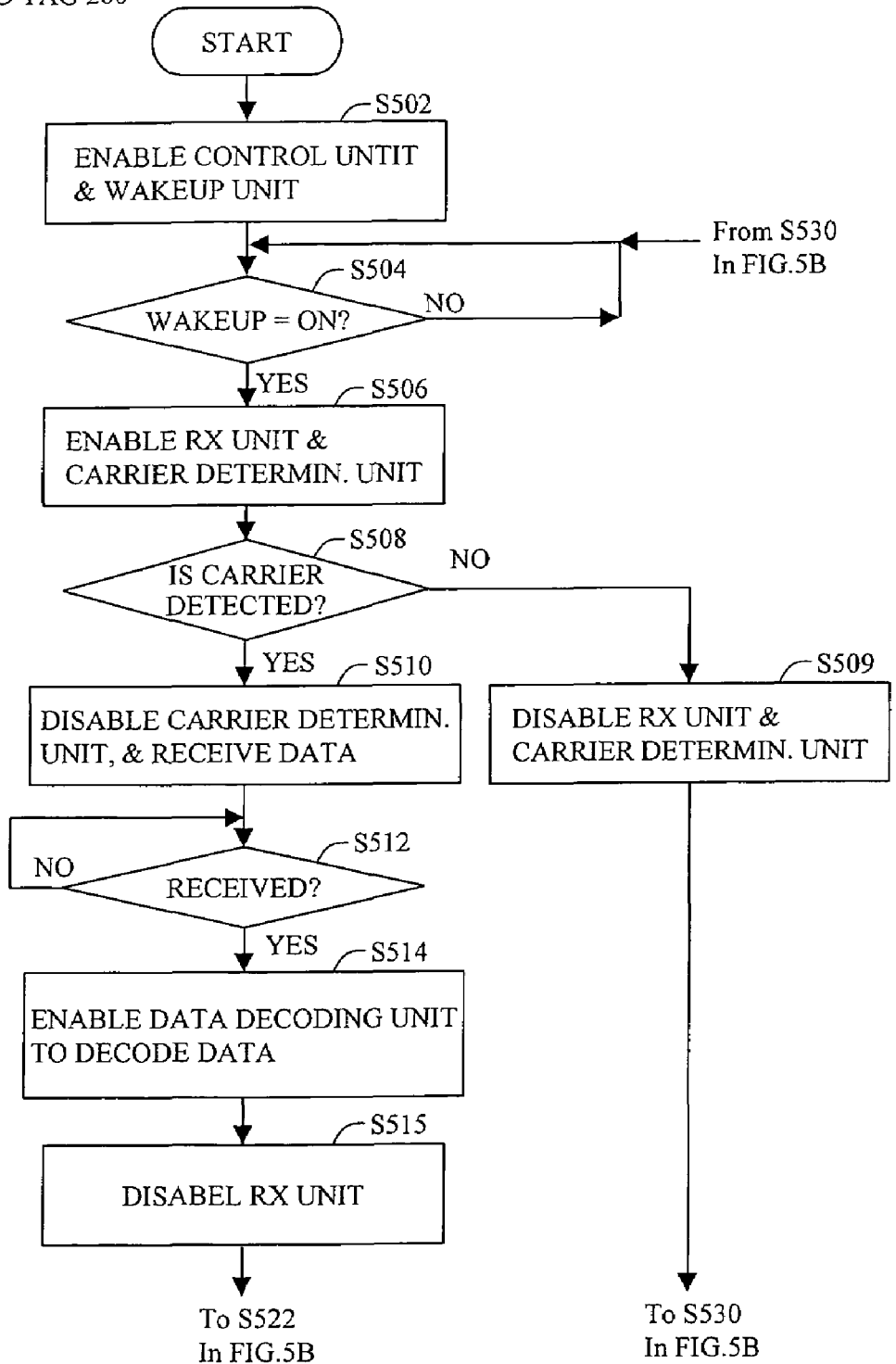
FIGS. 5A and 5B show a flow chart for the processing performed by the active-type RF ID tag.
Figure 5B:
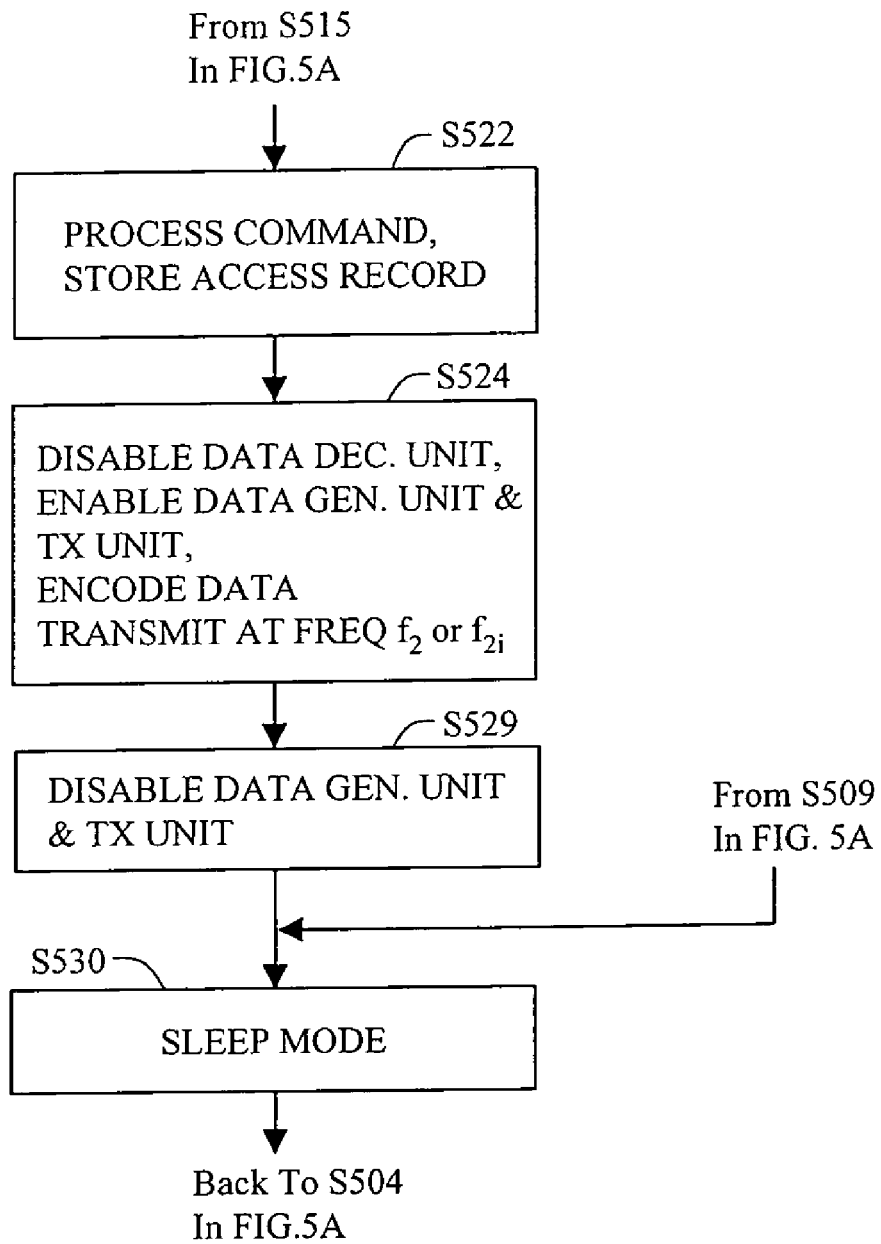

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the tag ID request command and the related information to the data generation unit 320. The data generation unit 320 generates data containing the tag ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the tag ID request command, data for specifying the transmission frequency $f_2$ or the variable transmission frequencies $f_{2i}$ used for a response to the tag ID request command; data indicative of time of day or time slots to be used for the variable transmission frequencies $f_{2i}$; data indicative of the current time of day T; and a control schedule and a time control sequence.

The reader/writer device 300 may change the frequencies $f_{2i}$ in the order in a time division manner, selecting one of the frequencies for every set of commands in respective transmission cycles $t_{RW-CY}$, the number of which corresponds to the time length of one or more cycles of sensing a carrier. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are continuously enabled, and hence in an active state. In accordance with the timer 274 and with the time control sequence, the wakeup unit 270 provides the control unit 210 with a wakeup signal indicative of the timing for carrier sensing of a received RF signal in a predetermined cycle Tcs. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the tag ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the tag ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). Such a random number is generated by the random number generator unit 211. This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{2i}$. The frequency $f_{2i}$ is changed by the frequency changing unit 212 of the control unit 210. The timing unit 213 adjusts a plurality of successive cycle time slots to occur in a predetermined cycle.

At Step 529, the control unit 210 disables the data generation unit 220 and the transmitter unit 230. At Step 530, the control unit 210 causes the RF ID tag 200 to enter into the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter into the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme to thereby reproduce the response data, and then provides notification of the data reception and the response data to the control unit 310.

At Step 432, the control unit 310 transmits the decoded data to the host computer. At Step 436, the control unit 310 determines whether the data receive ready state is to be terminated. If it is determined that the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs transmission cyclically at sufficiently short intervals, and is continuously in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of one second), while, when the remaining battery power level goes below a threshold, carrier sensing may be performed in a relatively long cycle (e.g., of two seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
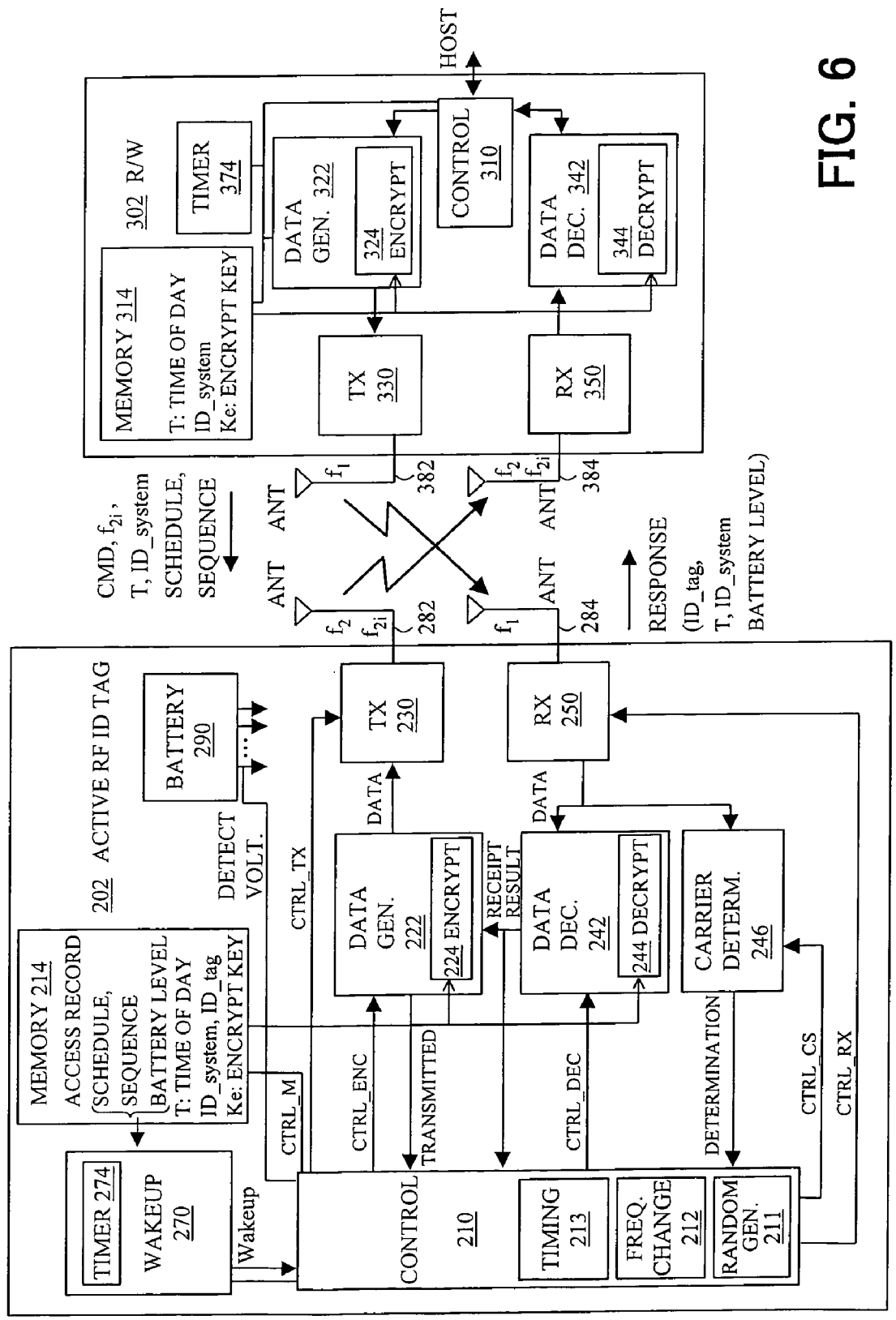
FIG. 6 shows a modification of the configurations of FIG. 2, and illustrates the configurations of a more secure active-type RF ID tag and of a reader/writer device.

FIG. 6 shows modification of the configurations of FIG. 2, and illustrates the configurations of a more secure slave, active-type RF ID tag 202 and of a master reader/writer device 302. In these configurations, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem herein. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 324 includes an encryption unit 322 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figure 7:
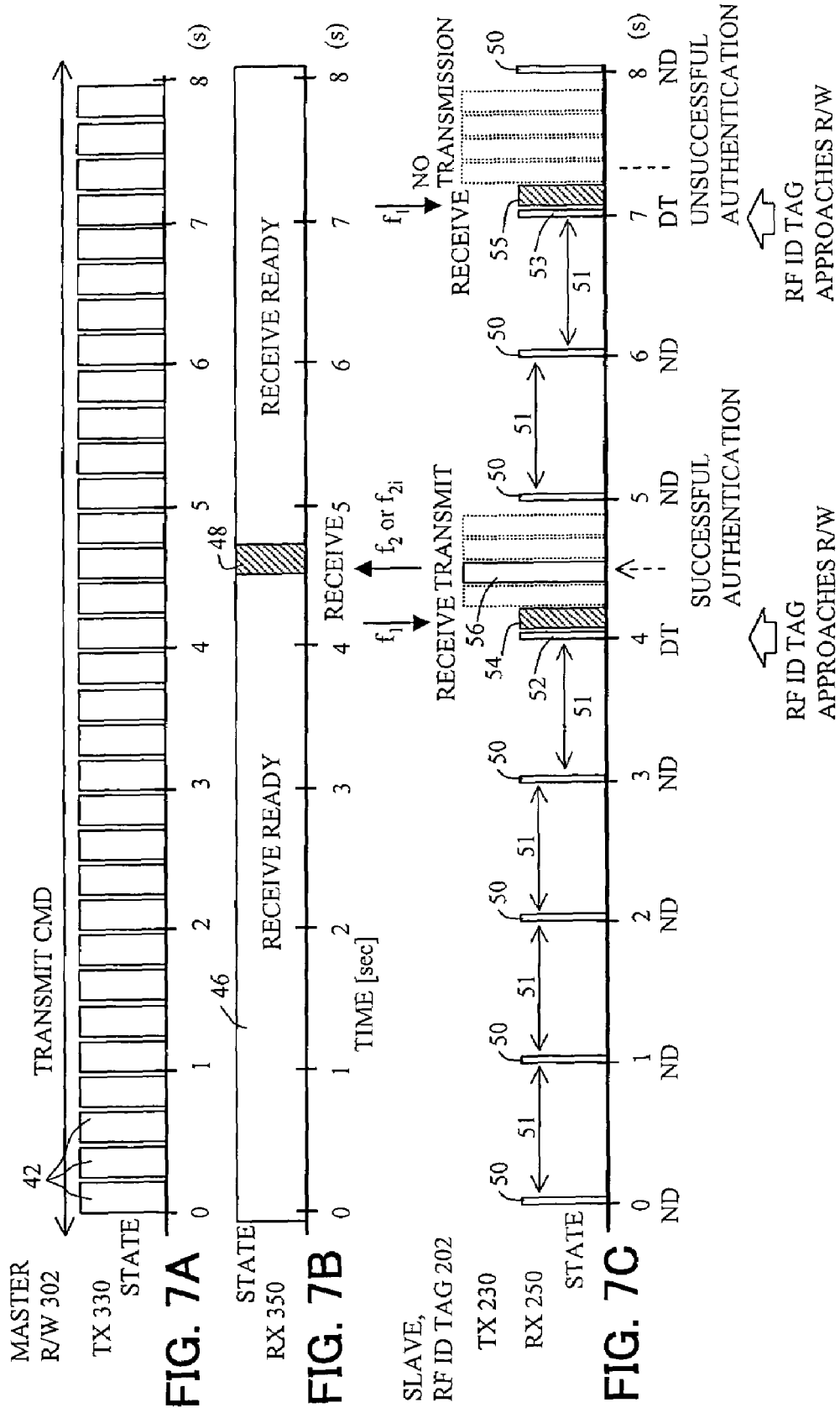
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying a tag ID request command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50, 52 and 53, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, and encodes the data in accordance with the predetermined encoding scheme to thereby generate encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50, 52 and 53 with the predetermined duration occurring in the fixed cycle, so that the enabled receiver unit 250 enters into a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby reproduce encoded encrypted data containing the command. The enabled data decoding unit 242 decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to reception of the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is continuously in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID and other information to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
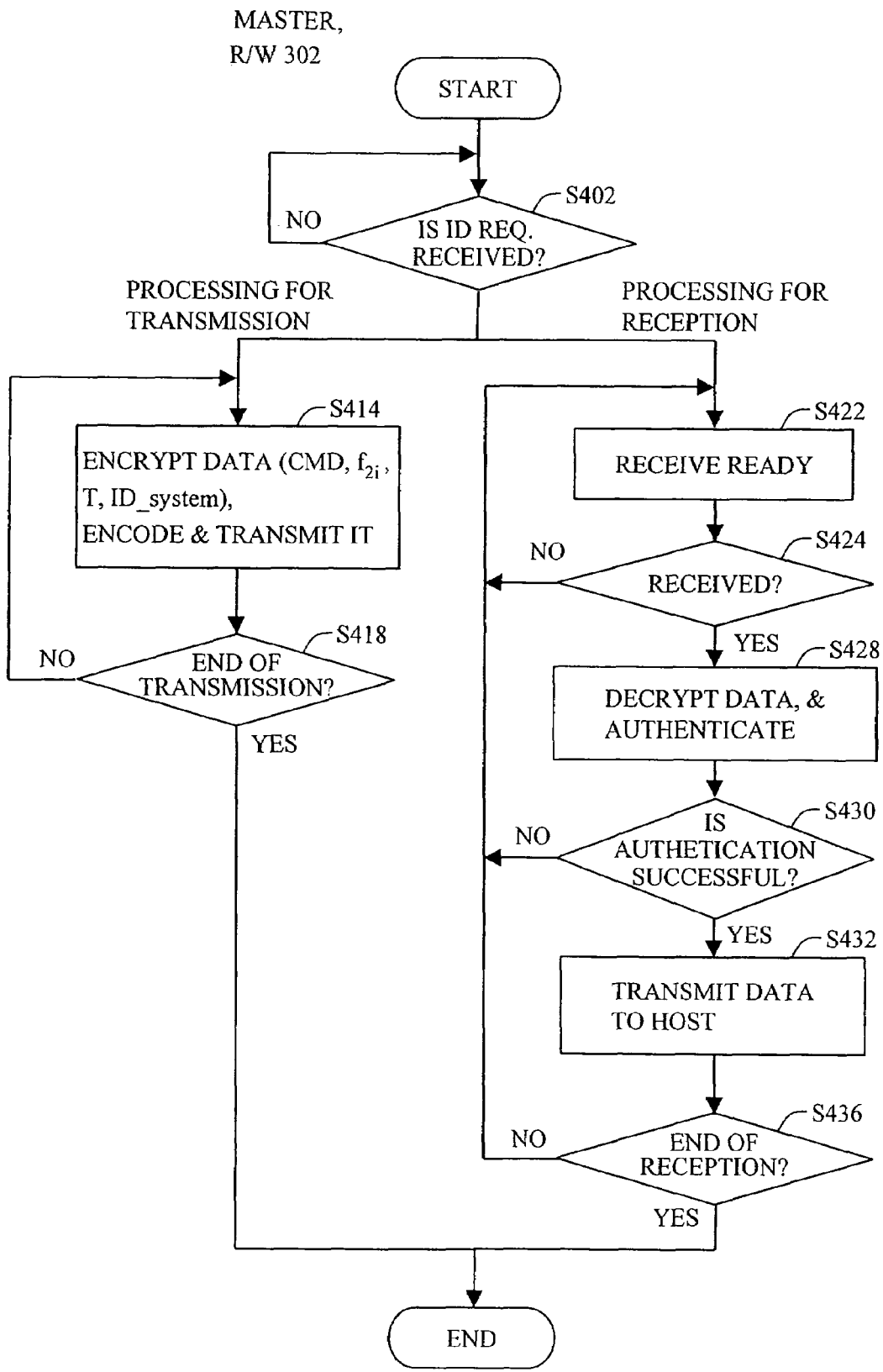
FIG. 8 shows a flow chart for the processing performed by the reader/writer device.
Figure 9A:
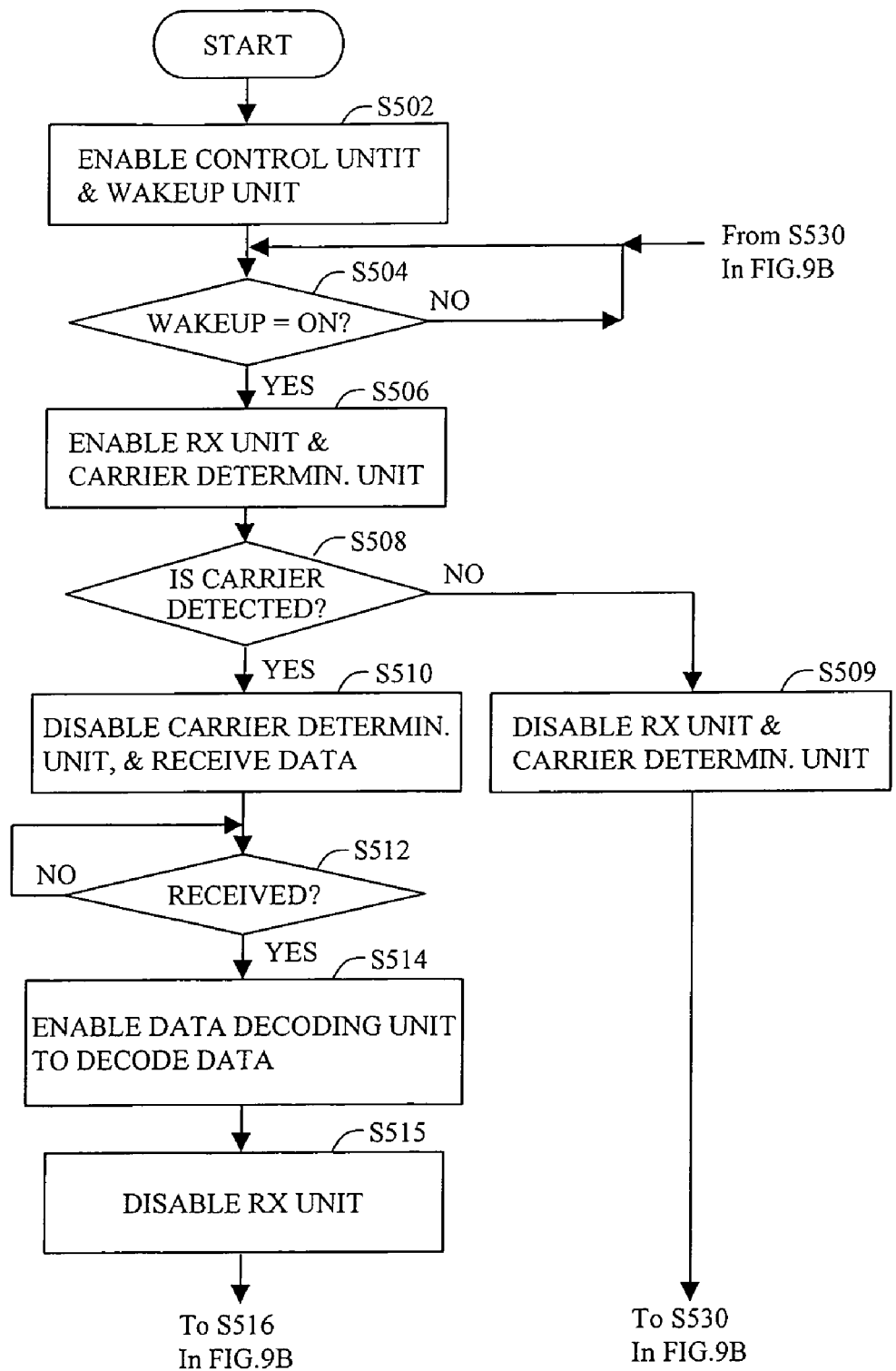
FIGS. 9A and 9B show a flow chart for the processing performed by the active-type RF ID tag.
Figure 9B:
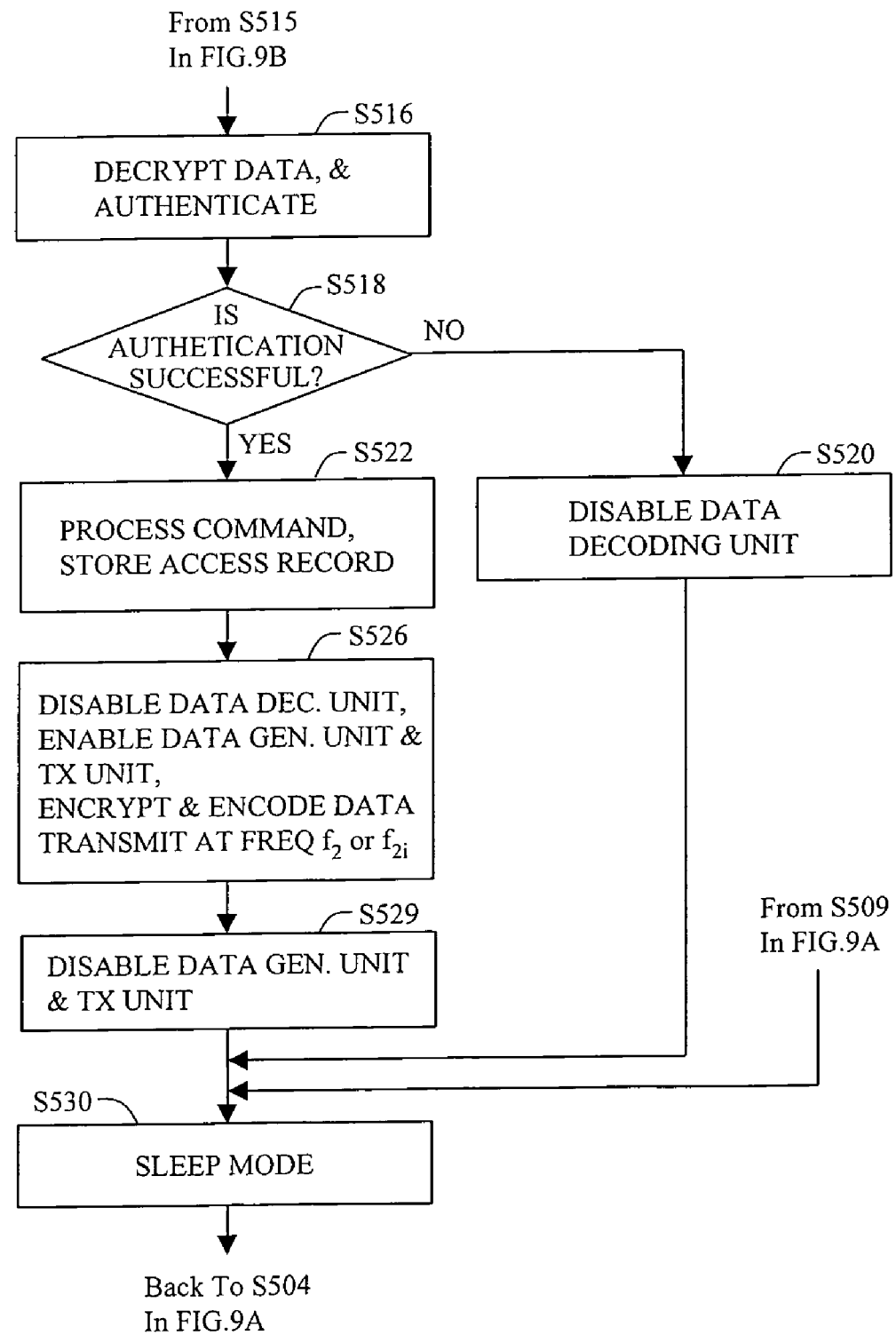

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the tag ID request command to the data generation unit 322. The data generation unit 322 encrypts data containing the tag ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data to thereby generate encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the tag ID request command, then processes the decrypted received command contained in decoded data, and then stores into the memory 214 the record of access from the reader/writer device 302.

At Step 526, in accordance with the tag ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8, Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

Each of the active RF ID tags 200 and 202 described above operates only as a slave device, and each of only the reader/writer devices 300 and 302 described above operates as a master device. Thus, when the reader/writer device 300 or 302 moves away from the active RF ID tag, the active RF ID tag 300 or 302 cannot communicate with another slave active RF ID tag which has been located near the reader/writer device.

The inventors have recognized that an active RF ID tag 200 or 202 may be adapted to operate in a slave mode of operation when a reader/writer device 300 or 302 is located near the RF ID tag, and adapted to operate in a master mode of operation when the reader/writer device 300 or 302 is not located near the RF ID tag, so that the active RF ID tag 200 or 202 operates as if it were another reader/writer device in the master mode of operation to communicate with other active RF ID tags. Thus, the active RF ID tags can exchange information with each other or associate themselves with each other.

Figure 10:
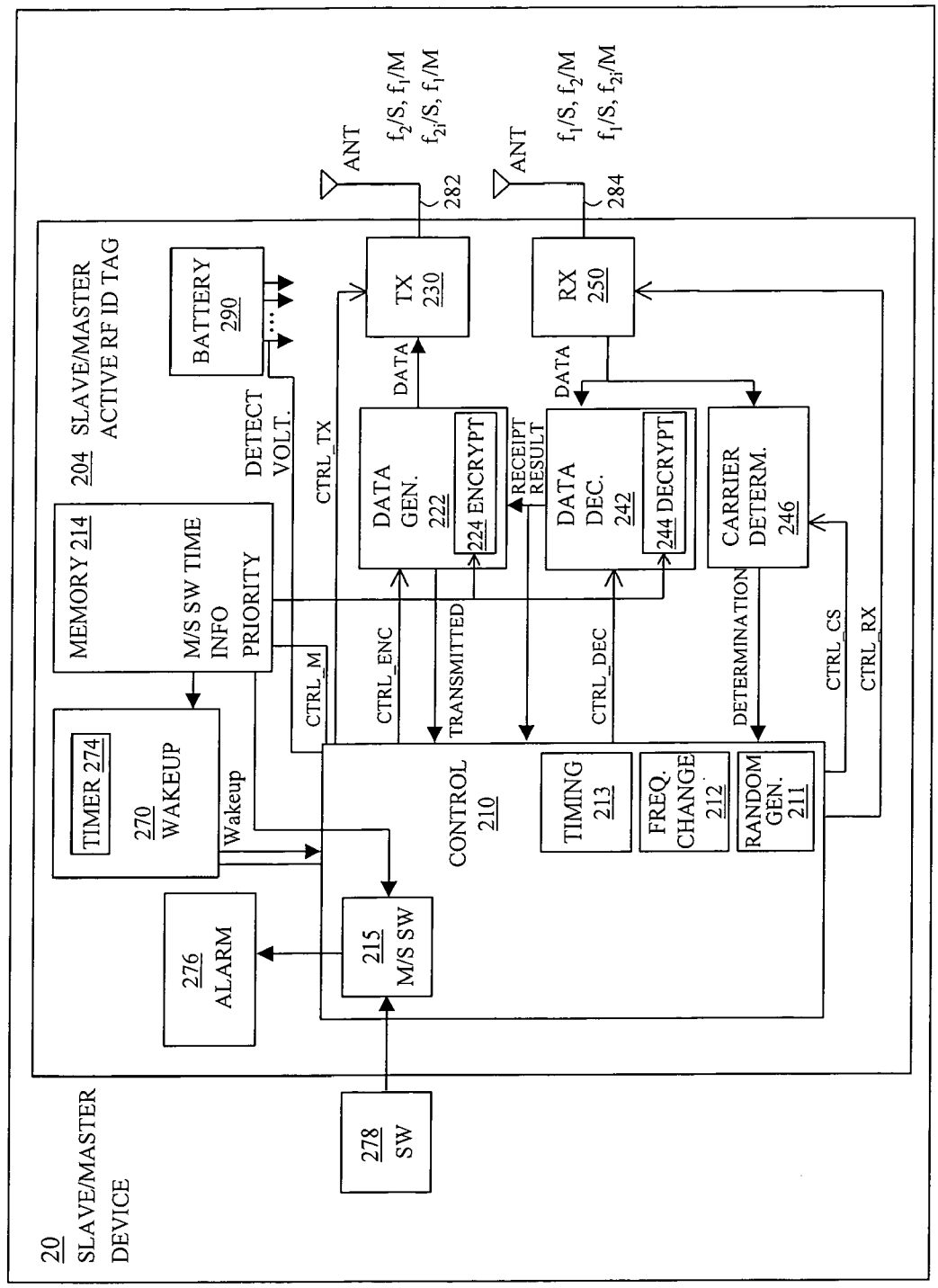
FIG. 10 shows a configuration of a slave/master device including a slave/master active RF ID tag operating as a slave or a master, in accordance with an embodiment of the invention.
Figure 11:
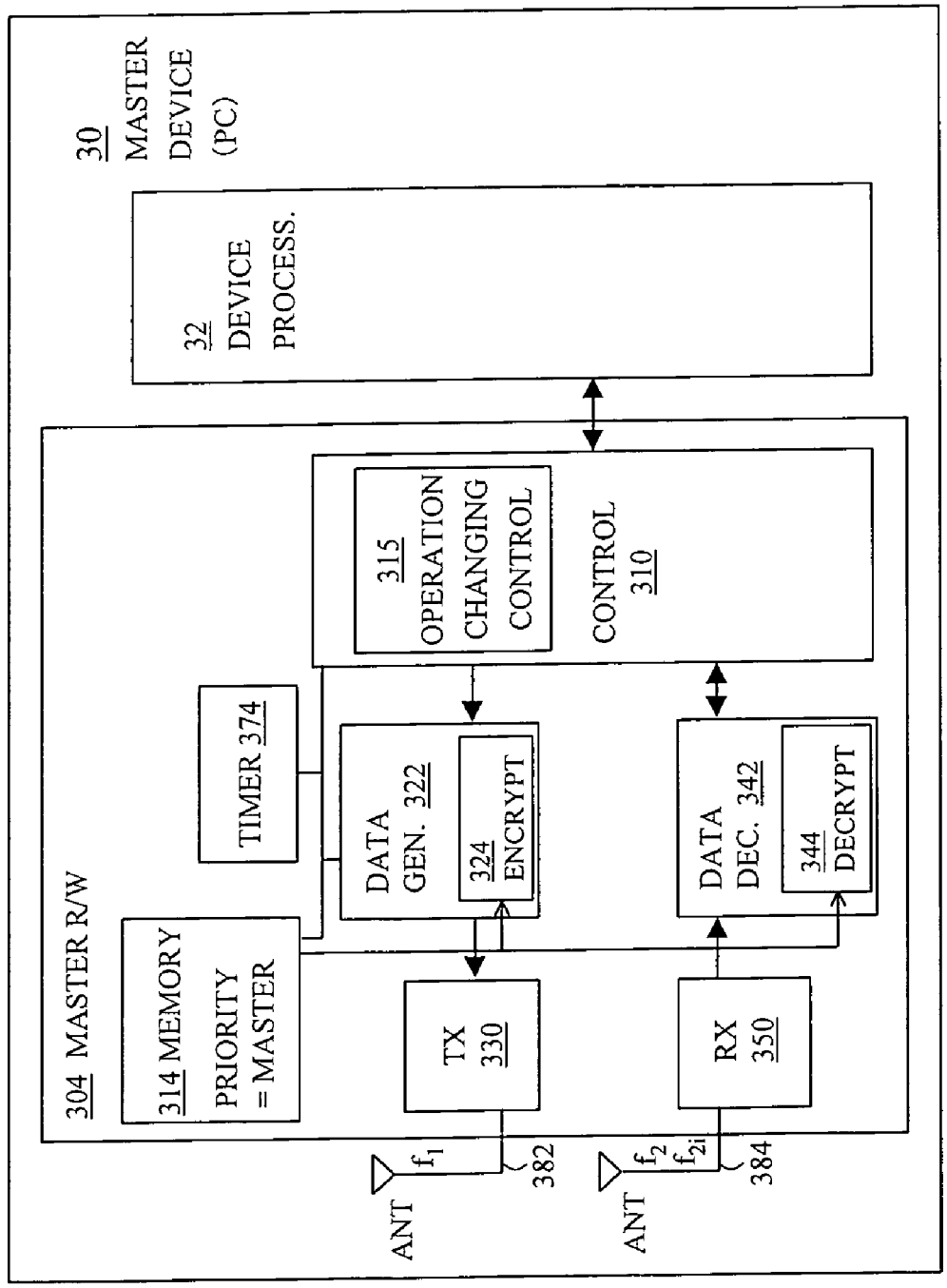
FIG. 11 shows a configuration of a master device including a master reader/writer device (R/W), in accordance with the embodiment of the invention.

FIG. 10 shows a modification of the slave active RF ID tag 202 of FIG. 6, and shows a configuration of a slave/master device 20 including a slave/master active RF ID tag 204 operating as a slave or a master, in accordance with an embodiment of the invention. The slave/master device 20 may be an electronic device such as a mobile telephone and a PDA (Personal Digital Assistant), or an article such as a name tag, a badge and a baggage tag. FIG. 11 shows a modification of the master reader/writer device 302 of FIG. 6, and shows a configuration of a master device 30 including a master reader/writer device (R/W) 304 and a device processing unit 32, in accordance with the embodiment of the invention. The master device 30 may be an electronic device such as a personal computer (PC). A slave device (not shown) including the slave active RF ID tag 202 may also be used.

In addition to the elements of the RF ID tag 202 of FIG. 6, the slave/master RF ID tag 204 of FIG. 10 includes an alarm unit 276 having an indicator such as an LED, an audio generator such as a beep generator, and/or a speaker, and further includes a master/slave (M/S) switching unit 215 within the control unit 210. In addition to the information described above, the memory 214 stores master/slave switching time information or a switching time schedule, and a priority (e.g., 1 to 9) of the master/slave device 20 or the RF ID tag 204. The control unit 210 switches the functions between a master mode of operation M and a slave mode of operation S, in accordance with a control signal from the master/slave switching unit 215. In the slave mode of operation S, the RF ID tag 204 operates similarly to the RF ID tag 202 of FIG. 6. In the master mode of operation M, the RF ID tag 204 operates similarly to the reader/writer device 302 of FIG. 6. However, the RF ID tag 204 may transmit a tag ID in place of a system ID, in the master mode of operation M. In accordance with the control signal from the frequency switching unit 212, the transmitter unit (TX) 230 transmits an RF signal at the transmission frequency $f_1$ in the master mode of operation M, and transmits an RF signal at the transmission frequency $f_2$ or $f_{2i}$ in the slave mode of operation S. In accordance with the control signal from the frequency switching unit 212, the receiver unit (RX) 250 receives an RF signal at the reception frequency $f_2$ or $f_{2i}$ (referred to simply as $f_2$ hereinafter) in the master mode of operation M, and receives an RF signal at the reception frequency $f_1$ in the slave mode of operation S.

In addition to the information described above, the memory 314 of the reader/writer device 304 of FIG. 11 stores master/slave switching time information or a switching time schedule and a priority (e.g., the master level 0) of the master device 30 or the reader/writer device 304. The control unit 310 of the reader/writer device 304 includes an operation changing control 315 for changing the operation of the reader/writer device 304. The reader/writer device 304 operates in the same manner as the reader/writer device 302.

Figure 12A:
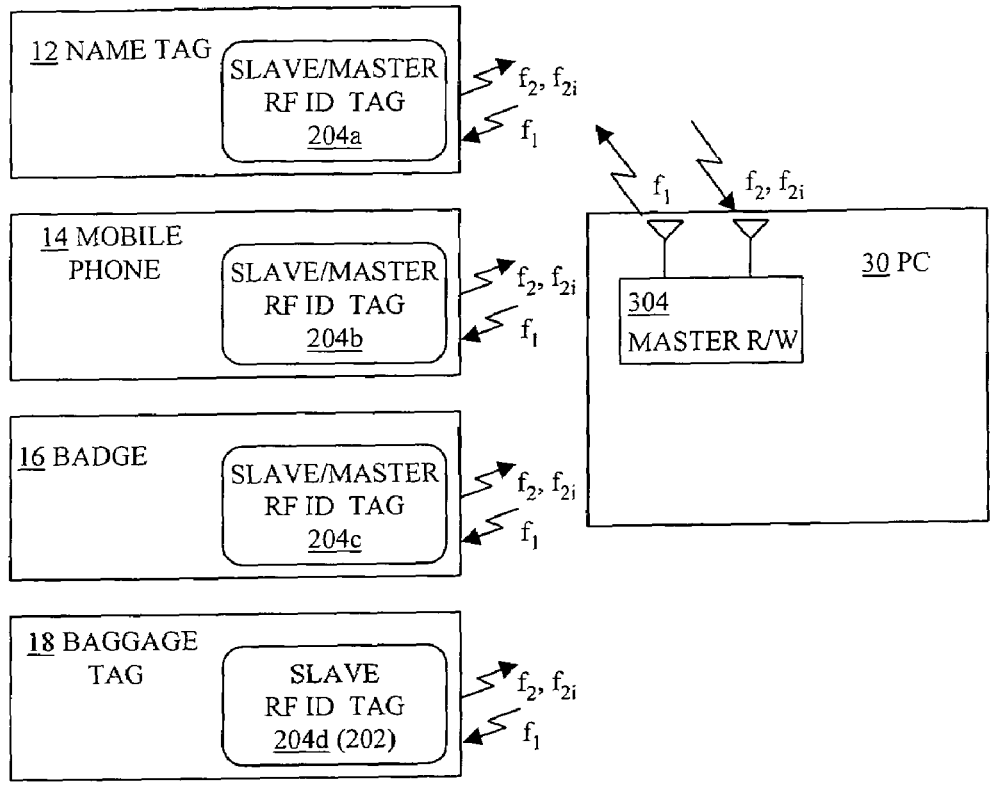
FIG. 12A shows an example of communication between a personal computer as a master, and a name tag, a mobile telephone and a badge each serving as a slave/master, and a baggage tag as a slave, within a communication range of the personal computer, in accordance with the embodiment of the invention.
Figure 12B:
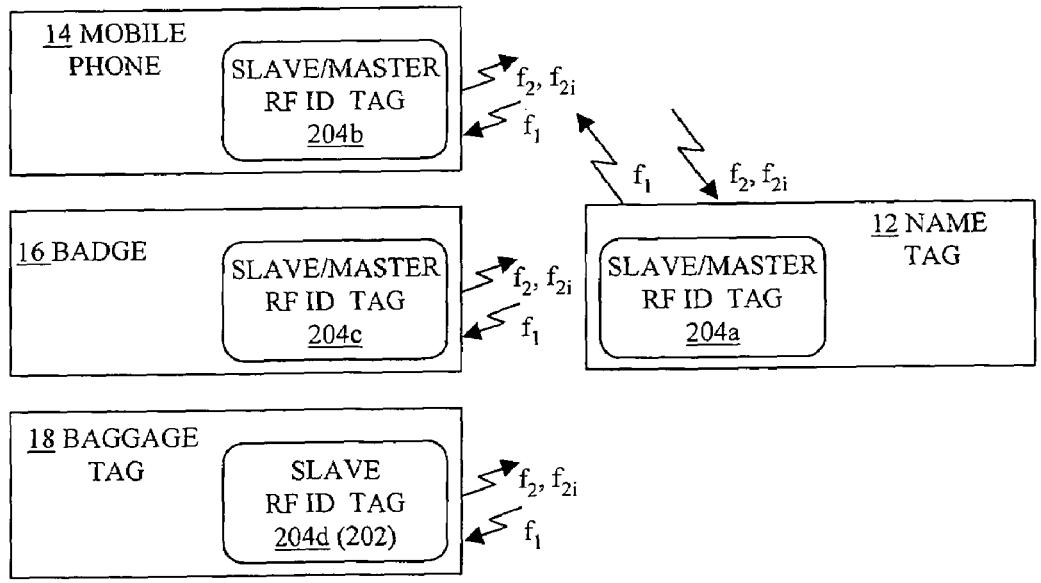
FIG. 12B shows an example of communication between the name tag as a slave/master, and the mobile telephone and the badge each serving as a slave/master, and the baggage tag as a slave, when the personal computer as a master in the configuration of FIG. 12A has moved away from the other devices.

FIG. 12A shows an example of communication between a personal computer 30 as a master, and a name tag 12, a mobile telephone 14 and a badge 16 each serving as a slave/master, and a baggage tag 18 as a slave, within a communication range of the personal computer 30, in accordance with the embodiment of the invention. FIG. 12B shows an example of communication between the name tag 12 as a slave/master, and the mobile telephone 14 and the badge 16 each serving as a slave/master, and the baggage tag 18 as a slave, when the personal computer 30 as a master in the configuration of FIG. 12A has moved away from the other devices.

The personal computer 30 includes the master reader/writer device 304. The name tag 12 includes a slave/master active RF ID tag 204*a*. The mobile telephone 14 includes a slave/master active RF ID tag 204*b*. The badge 16 includes a slave/master active RF ID tag 204*c*. The RF ID tags 204*a*-204*c* are similar to the RF ID tag 204. The baggage tag 18 includes a slave active RF ID tag 204*d* that operates in the same manner as the RF ID tag 202 of FIG. 6.

In FIG. 12A, in a conventional manner, the master reader/writer device 304 of the personal computer 30 transmits a tag ID request signal at the transmission frequency $f_1$ to the name tag 12, the mobile telephone 14, the badge 16 and the baggage tag 18, and then receives response signals at the reception frequency $f_2$ from them. Each of the name tag 12, the mobile telephone 14, the badge 16 and the baggage tag 18 receives the tag ID request signal at the reception frequency $f_1$ from the personal computer 30, and then transmits a response signal at the transmission frequency $f_2$ back to the personal computer 30.

In FIG. 12B, when the personal computer 30 has moved away from its original position, the name tag 12 with the highest priority among the name tag 12, the mobile telephone 14, the badge 16 and the baggage tag 18 starts to operate in a master mode of operation M, i.e., transmits a tag ID request signal at the transmission frequency $f_1$ to the mobile telephone 14, the badge 16 and the baggage tag 18 and then receives response signals at the reception frequency $f_2$ from them. Each of the mobile telephone 14, the badge 16 and the baggage tag 18 receives the tag ID request signal at the reception frequency $f_1$ from the name tag 12, and then transmits a response signal at the transmission frequency $f_2$ to the name tag 12. Thus, the name tag 12, the mobile telephone 14, the badge 16 and the baggage tag 18 can communicate with each other and exchange information with each other, even if the personal computer 30 is absent near them.

FIGS. 13A and 13B show a time chart of a temporal change of the operation mode of the slave/master device 20 from the slave mode of operation S to the master mode of operation M, in response to a user's operation of pressing a key switch 278 in FIG. 10. In FIG. 13B, the slave/master device 20 normally operates in the slave mode of operation S. In FIG. 13A, if the user presses and thereby turns ON the key switch 278 of FIG. 10, then the master/slave switching unit 215 controls the slave/master device 20 during the turn-ON state of the key switch 278, as shown in FIG. 13B, to operate in the master mode of operation M as described above, and causes the alarm unit 276 to generate an alarm. The alarm may be an audible or auditory sound, or alternatively a visual indication on a light emitting diode or the like. When the user stops pressing and thereby turns OFF the key switch 278, the master/slave switching unit 215 controls the slave/master device 20 to operate in the original slave mode of operation S as described above.

FIGS. 14A and 14B show another time chart of a temporal change of the operation mode of the slave/master device 20 from the slave mode of operation S to the master mode of operation M for a predetermined period of time Tmm, in response to a user's operation of pressing the key switch 278 in FIG. 10. In FIG. 14B, the slave/master device 20 normally operates in the slave mode of operation S. In FIG. 14A, if the user presses and thereby turns ON the key switch 278 of FIG. 10, then the master/slave switching unit 215 controls the slave/master device 20 in a predetermined period of time Tmm from the turn-ON time, as shown in FIG. 14B, to operate in the master mode of operation M as described above, and causes the alarm unit 276 to generate an alarm. After the predetermined period of time Tmm, the master/slave switching unit 215 controls the slave/master device 20 to operate in the original slave mode of operation S as described above. The predetermined period of time Tmm is measured or counted by the timer 274 of the wakeup unit 270 in accordance with the master/slave switching time information stored in the memory 214. When the timer 274 has measured or counted up the elapse of the predetermined period of time Tmm, it provides, to the master/slave switching unit 215, a signal indicative of the elapse of the predetermined period of time Tmm.

FIG. 15 shows an example of a table showing the priorities in the master/slave (M/S) operations of different devices, where, a smaller value of the priority indicates a higher priority of operating as a master, while a larger value of the priority indicates a lower priority of operating as a master. The personal computer which is a device with the highest priority 0 (zero) operates permanently as a master. Another device K with the lowest priority 10 operates @permanently as a slave. The devices with respective priorities 1-9 has capability of operating temporarily either in the slave mode of operation S1-S9 or in the master mode of operation S1-S9. In FIG. 10, the personal computer 30 (master reader/writer device 304) has, for example, a priority 0. The name tag 12

(slave/master RF ID tag 204a) has, for example, a priority 1 (one). The mobile telephone 14 (slave/master RF ID tag 204b) has, for example, a priority 2. The badge 16 (slave/master RF ID tag 204c) has, for example, a priority 3. The baggage tag 18 (slave RF ID tag 204d) has, for example, a priority 10.

FIG. 16 shows conditional operations of ones or one of the three devices, when any other one or ones of the three devices move away and disappear after the three devices have been located within their mutual or common communication ranges in the initial state.

In Item 1.1 of FIG. 16, in the initial state, the personal computer 30 as a master M0 with a priority 0, the name tag 12 operating in the slave mode of operation S1 with a priority 1, and the mobile telephone 14 operating in the slave mode of operation S2 with a priority 2 are located in the mutual communication ranges. Even after that, all of these devices continue to be located in the same communication ranges. Thus, these three devices 30, 12 and 14 maintain their respective modes of operation in the initial state.

In Item 1.2, initially, the personal computer 30 as a master M0 with a priority 0 disappears, while the name tag 12 operating in the slave mode of operation S1 with a priority 1 and the mobile telephone 14 operating in the slave mode of operation S2 with a priority 2 are still located in the mutual communication ranges. After a while, the name tag 12 (S1) turns to operate in a slave/master alternation mode of operation (M1, S1), in which it operates cyclically and alternately switching between the master mode of operation M1 and the slave mode of operation S1, in accordance with its priority 1 which is higher than those of the other devices.

In Item 1.3, initially, the name tag 12 operating in the slave mode of operation S1 with a priority 1 disappears, while the personal computer 30 as a master M0 with a priority 0 and the mobile telephone 14 operating in the slave mode of operation S2 with a priority 2 are still located in the mutual communication ranges. Even after a while, the personal computer 30 (M0) continues to operate in the master mode of operation M0 in accordance with its highest priority 0 which is higher than those of the other devices (S1, S2). Thus, the personal computer 30 (M0) and the mobile telephone 14 (S2) maintain their initial modes of operation.

In Item 1.4, initially, the mobile telephone 14 operating in the slave mode of operation S2 with a priority 2 disappears, while the personal computer 30 as a master M0 with a priority 0 and the name tag 12 operating in the slave mode S1 of operation with a priority 1 are still located in the mutual communication ranges. Even after a while, the personal computer 30 (M0) continues to operate in the master mode of operation M0 in accordance with its highest priority 0 which is higher than those of the other devices (S1, S2). Thus, the personal computer 30 (M0) and the name tag 12 (S1) maintain their initial operation modes of operation.

In Item 1.5, initially, the name tag 12 operating in the slave mode of operation S1 with a priority 1 and the mobile telephone 14 operating in the slave mode of operation S2 with a priority 2 disappear, while the personal computer 30 as a master M0 with a priority 0 remains to be located there alone. Even after a while, the personal computer 30 (M0) continues to operate in the master mode of operation M0 in accordance with its highest priority 0, and maintains its initial operation mode of operation.

In Item 1.6, initially, the personal computer 30 as a master M0 with a priority 0 and the mobile telephone 14 operating in the slave mode of operation S2 with a priority 2 disappear, while the name tag 12 operating in the slave mode of operation S1 with a priority 1 remains to be located there alone. After a while, near the name tag 12, there is no other device having a priority higher than or equal to that of the name tag 12, and hence the name tag 12 (S1) terns to operate in the slave/master alternation mode of operation (M1, S1), in which it operates cyclically and alternately switching between the master mode of operation M1 and the slave mode of operation S1.

In Item 1.7, initially, the personal computer 30 as a master M0 with a priority 0 and the name tag 12 operating in the slave mode of operation S1 with a priority 1 disappear, while the mobile telephone 14 operating in the slave mode of operation S2 with a priority 2 remains to be located there alone. After a while, near the mobile telephone 14, there is no other device having a priority higher than or equal to that of the mobile telephone 14, and hence the mobile telephone 14 (S2) starts to operate in the slave/master alternation mode of operation (M2, S2), in which it operates cyclically and alternately switching between the master mode of operation M2 and the slave mode of operation S2.

FIG. 17 shows conditional operations of the three devices, when any one or ones of the three devices appear within their mutual communication ranges and participate in the communication among them, after the other one or ones of the three devices have been located alone or within the mutual communication ranges in communication with each other in the initial state.

Item 2.1 of FIG. 17 is the same as Item 1.1.

In Item 2.2, initially, the name tag 12 operating in the slave/master alternation mode of operation (M1, S1) between the master mode of operation M1 and the slave mode of operation S1 and having a priority 1 which is higher than those of the other devices (S2), and the mobile telephone 14 operating in the slave mode of operation S2 with a priority 2 are located in the mutual communication ranges. After a while, the personal computer 30 as a master (M0) with a priority 0 appears within the communication ranges, and participates in the communication. Then, the name tag 12 (S1) detects the presence of the personal computer 30 as a master (M0) having the priority 0 higher than that of the name tag 12, and thereby goes to the slave mode of operation S1.

In Item 2.3, initially, the personal computer 30 as a master (M0) with a priority 0 and the mobile telephone 14 operating in the slave mode of operation S2 with a priority 2 are located in the mutual communication ranges. The name tag 12 operating as a slave/master with a priority 1 then appears within the communication ranges. After a while, the name tag 12 first operates in the slave mode of operation S1, then detects the presence of the personal computer 30 as a master (M0) having the priority 0 higher than that of the name tag 12, and thereby continues to operate in the slave mode of operation S1. The personal computer 30 (M0) and the mobile telephone 14 (S2) maintain the initial modes of operation.

In Item 2.4, initially, the personal computer 30 as a master (M0) with a priority 0 and the name tag 12 operating in the slave mode of operation S1 with a priority 1 are located in the mutual communication ranges. The mobile telephone 14 operating as a slave/master with a priority 2 then appears within the communication ranges. The mobile telephone 14 first operates in the slave mode of operation S2, then detects the presence of the personal computer 30 as a master (M0) having the priority 0 higher than that of the mobile telephone 14 by detecting the system ID (ID_system) thereof, and thereby continues to operate in the slave mode of operation S2. The personal computer 30 (M0) and the name tag 12 (S1) maintain the initial modes of operation.

In Item 2.5, initially, the personal computer 30 as a master (M0) with a priority 0 is located alone. The name tag 12 operating as a slave/master with a priority 1 and the mobile telephone 14 operating as a slave/master with a priority 2 then appear within the communication range of the personal computer 30. After that, the name tag 12 continues to operate as a slave (S1), and the mobile telephone 14 continues to operate as a slave (S2). The personal computer 30 (M0) continues to operate in the master mode of operation M0.

In Item 2.6, initially, the name tag 12 operating as a slave/master with a priority 1 is located alone. The personal computer 30 as a master (M0) with a priority 0 and the mobile telephone 14 operating as a slave/master with a priority 2 then appear within the communication range of the name tag 12. After a while, the name tag 12 detects the presence of the personal computer 30 having the priority 0 which is higher than that of the name tag 12, and thereby goes to the slave mode of operation S1.

In Item 2.7, initially, the mobile telephone 14 as a slave/master with a priority 2 is located alone. The personal computer 30 as a master (M0) with a priority 0 and the name tag 12 operating as a slave/master with a priority 1 then appear within the communication range of the mobile telephone 14. After a while, the mobile telephone 14 detects the presence of the personal computer 30 having the priority 0 higher than that of the mobile telephone 14, or detects the name tag 12 having the priority 1 higher than that of the mobile telephone 14 by detecting the tag ID (ID_tag) thereof, and thereby goes to the slave mode of operation S2.

FIG. 18 shows further conditional operations of one or ones of the three devices, when any other one or ones of the three devices move away and disappear after the three devices have been located within the mutual communication ranges in the initial state. In this case, the mobile telephone 14 has a priority 10 indicating the permanent slave mode of operation.

In Item 3.1 of FIG. 18, in the initial state, the personal computer 30 as a master M0 with a priority 0, the name tag 12 operating in the slave mode of operation S1 with a priority 1, and the mobile telephone 14 operating in the slave mode of operation S10 with a priority 10 are located in the mutual communication ranges. Even after a while, all of these devices continue to be located in the same communication ranges. Thus, these three devices 30, 12 and 14 maintain their respective modes of operation in the initial state.

The personal computer 30, the name tag 12 and the mobile telephone 14 in Items 3.2-3.6, operate in the same manner as in Items 1.2-1.6 of FIG. 16 described above.

In Item 3.7, initially, the personal computer 30 as a master M0 with a priority 0 and the name tag 12 operating in the slave mode of operation S1 with a priority 1 disappear, while the mobile telephone 14 as slave S10 with a priority 10 remains to be located there alone. Even after a while, the mobile telephone 14 maintains the slave mode of operation S10.

FIGS. 19A-19F show time charts of the operations of two slave/master devices D1 and D2 with different priorities located within the mutual communication ranges, according to Item 1.2 in FIG. 16.

FIG. 19A shows a time chart of the slave/master alternation mode of operation (M1, S1) of the first slave/master device D1 with a higher priority (e.g., 1). FIG. 19B shows a time chart of processing for transmission 56 of an RF signal at the transmission frequency $f_2$ carrying a response, and further processing for transmission 42 of an RF signal at the transmission frequency $f_1$ carrying data containing information, such as a tag ID or an information request command, in the first slave/master device D1, where no other master device with the highest priority (0) is located near the first slave/master device D1 and where the second slave/master device D2 with a lower priority (e.g., 2) is located within the communication range of the first slave/master device D1. FIG. 19C shows a time chart of carrier sensing 50 and 52 at the reception frequency $f_1$, processing for reception 54 of a received RF signal at the reception frequency $f_1$, a receive ready state 46 at the reception frequency $f_2$, and further processing for reception 48 of a received RF signal at the reception frequency $f_2$, in the first slave/master device D1.

FIG. 19D shows a time chart of the mode of operation (M2, S2) of the second slave/master device D2 with a lower priority (e.g., 2). FIG. 19E shows a time chart of processing for transmission 56 of an RF signal at the transmission frequency $f_2$ carrying a response, and further processing for transmission 42 of an RF signal at the transmission frequency $f_1$ carrying data, such as a tag ID request command, in the second slave/master device D2, where no other master device with the highest priority (0) is located near the second slave/master device D2 and where the first slave/master device D1 with the higher priority (e.g., 1) is located within the communication range of the second slave/master device D2. FIG. 19F shows a time chart of carrier sensing 50 and 52 at the reception frequency $f_1$, processing for reception 54 of a received RF signal at the reception frequency $f_1$, a receive ready state 46 at the reception frequency $f_2$, and further processing for reception 48 of a received RF signal at the reception frequency $f_2$, in the second slave/master device D2.

In operation, as shown in FIGS. 19A and 19D, the slave/master devices D1 and D2 operate in the slave mode of operation (S1 and S2, respectively) in the initial state. Each receiver unit (RX) 250 of the devices D1 and D2 performs carrier sensing 50 in the predetermined cycle Tcs. If no carrier at the transmission frequency $f_1$ is detected by the devices D1 and D2, i.e., if no other device operating in the master mode of operation M is detected within the corresponding predetermined period of time Td1 or Td2, then either one of the slave/master devices D1 and D2 may go to and maintain the master mode of operation (M1 or M2) temporarily for a predetermined period of time Tm. In this case, first, the slave/master device D2 goes to the master mode of operation M2 after the period of time Td2.

In the period of time Tm in the master mode of operation M2, shown on the left side in FIG. 19D, in the device D2, the transmitter unit 230 performs processing for transmission 42 of an RF signal at the frequency $f_1$ as shown in FIG. 19E. In the processing for transmission 42, in the successive time slots within a predetermined period of time Tt (e.g., 2 seconds), an RF signal carrying information, such as a tag ID request command and the tag ID and the priority, of the device D2 is transmitted cyclically at sufficiently short intervals as described above. The receiver unit 250 of the device D2 is caused to be continuously in a receive ready state 46 at the frequency $f_2$ as shown in FIG. 19F. During the predetermined period of time Tm, the processing for transmission 42 having the predetermined period of time Tt is repeated cyclically or in a plurality of the predetermined periods of time Tt with intervening sleep periods of time, each having a predetermined length of time Tb. The transmitter unit 230 is disabled by the control unit 210 during the sleep period of time Tb. In this case, in response to the detection of the presence of the device D1 with the higher priority 1 by detecting the tag ID thereof, the operation of the device D2 is switched from the master mode of operation M2 to the slave mode of operation S2, during the subsequent sleep period of time Tb after the processing for transmission 42 in the first predetermined period of time Tt. Alternatively, the operation of the device D2 may be switched from the master mode of operation M2 to the slave mode of operation S2, after the predetermined period of time Tm has elapsed.

In the slave mode of operation S1, appearing first in FIG. 19A on the left side, in the device D1, the receiver unit 250 receives an RF signal at the frequency $f_1$ in the carrier sensing period 52, and then the carrier determination unit 246 detects a carrier of the RF signal at the frequency $f_1$ from the device D2 (DT). Subsequently, in the processing for reception 54 in the device D1, the receiver unit 250 receives and demodulates the RF signal, and thereby generates encoded data containing data, such as a tag ID request command and the like. The data decoding unit 240 decodes the encoded data in accordance with the predetermined encoding scheme, thereby reproduces data containing information, such as the tag ID request command, the tag ID and the priority, and then provides the reproduced data to the control unit 210. Thus, the control unit 210 of the device D1 detects the presence of the other device D2 having the priority 2 which is lower than that of the device D1, by detecting the tag ID thereof and the like. In the first slave mode of operation S1, the device D1 determines that the other device D2 is operating in the master mode of operation, and thereby maintains the slave mode of operation S1 even after the period of time Td1.

In response to the receipt of the tag ID request command, in the device D1, the control unit 210 performs the processing for transmission 56 in a time period or slot selected at random within the predetermined period of time, while the data generation unit 220 generates data containing information such as the tag ID and the priority retrieved from the memory 214, and then encodes the generated data for response, in accordance with the predetermined encoding scheme. Then, the transmitter unit 230 modulates the carrier with the encoded response data containing the tag ID and the like, and thereby transmits an RF response signal at the transmission frequency $f_2$.

In the device D2, the receiver unit 250 performs the processing for reception 48 of a received RF signal at the frequency $f_2$ in the master mode of operation M2. In the processing for reception 48, the RF signal is received and demodulated so that the encoded data containing the data, such as the tag ID and the like, is generated. Further, the data decoding unit 240 decodes the encoded data in accordance with the predetermined encoding scheme, thereby reproduces the non-encoded data, such as the tag ID and the priority, and then provides the reproduced data to the control unit 210. Thus, the control unit 210 of the device D2 detects the presence of the device D1 having the priority 1 which is higher than that of the device D2. Accordingly, after a predetermined period of time (e.g., the time period of one carrier sensing cycle Tcs), the master/slave switching unit 215 of the control unit 210 changes the operation mode of the device D2 into the slave mode of operation S2. Alternatively, the master/slave switching unit 215 of the device D2 may change the operation mode of the device D2 to the slave mode of operation S2, after the master mode period of time Tm elapses.

After the operation of the device D2 has changed from the master mode of operation M2 back to the slave mode of operation S2 in the second occurrence in the FIG. 19D, the device D1, in response to non-detection of the presence of another device having a priority higher than that of the device D1, goes to the master mode of operation M1, when the subsequent period of time Td1 elapses after the non-detection. Alternatively, in the first slave mode of operation S1, in accordance with the comparison between the priorities of the device D1 and of the device D2 operating in the master mode of operation M2, the master/slave switching unit 215 of the control unit 210 of the device D1 may change the operation mode of the device D1 into the master mode of operation M1, a predetermined length of time (e.g., the time period of one carrier sensing cycle Tcs) after the determination that the priority of the device D1 is higher than that of the other device D2.

In the period of time Tm in the first master mode of operation M1 shown in FIG. 19B in the center, the transmitter unit 230 of the device D1 performs the processing for transmission 42 of an RF signal at the frequency $f_1$. The receiver unit 250 of the device D1 turns to be continuously in a receive ready state 46 at the frequency $f_2$ as shown in FIG. 19C. During the predetermined period of time Tm, the processing for transmission 42 having the predetermined period of time Tt is repeated in a plurality of the predetermined periods of time Tt with the intervening sleep periods, each having the predetermined period of time Tb. The transmitter unit 230 is disabled by the control unit 210 during the sleep period of time Tb. This allows another possible device operating in the master mode of operation M to transmit an RF signal at the frequency $f_1$.

In the second slave mode of operation S2 in the device D2, the receiver unit (RX) 250 performs carrier sensing 50 and 52 in the predetermined cycle, and receives an RF signal at the frequency $f_1$ in the carrier sensing period 52, and then the carrier determination unit 246 detects a carrier of the RF signal at the frequency $f_1$ from the device D1 (DT). Subsequently, in the processing for reception 54, the receiver unit 250 of the device D2 receives and demodulates the RF signal, and thereby generates encoded data containing data, such as the tag ID request command. Further, the data decoding unit 240 decodes the encoded data in accordance with the predetermined encoding scheme, thereby reproduces data, such as the request command, the tag ID and the priority, and then provides the reproduced data to the control unit 210. Thus, the control unit 210 of the device D2 determines that the priority of the device D2 is lower than that of the device D1. In response to the command, in the device D2, the control unit 210 performs the processing for transmission 56 at a time period or slot selected at random within the predetermined period of time, while the data generation unit 220 generates data containing information, such as the tag ID and the priority retrieved from the memory 214, and then encodes the generated data for response, in accordance with the predetermined encoding scheme. Then, the transmitter unit 230 modulates the carrier with the response data containing the tag ID and the like, and thereby transmits an RF response signal at the transmission frequency $f_2$.

In the period of time Tm in the first master mode of operation M1, the receiver unit 250 of the device D1 performs the processing for reception 48 of a received RF signal at the frequency $f_2$. After that, the device D1 goes to and maintains the slave mode of operation S1 in a subsequent, predetermined period of time Ts. This allows the device D1 to receive an RF signal at the frequency $f_1$ from another possible device with a higher priority. In this manner, the device D1 repeats the master mode of operation M1 and the slave mode of operation S1 alternately, until the device D1 detects another device having a priority higher than that of the device D1.

FIGS. 20A-20I show time charts of the operations of two slave/master devices D1 and D2 with different priorities located within the mutual communication ranges and of a master device D0 with the highest priority appearing later within the communication ranges of the devices D1 and D2, according to Item 2.2 in FIG. 17.

FIG. 20A shows a time chart of the slave/master alternation mode of operation (S1, M1) of the first slave/master device D1. FIG. 20B shows a time chart of processing for transmission 56 of an RF signal at the transmission frequency $f_2$ carrying a response, and further processing for transmission 42 of an RF signal at the transmission frequency $f_1$ carrying data, such as the tag ID request command, in the first slave/master device D1 with a higher priority (e.g., 1), where the second slave/master device D2 with a lower priority (e.g., 2) is located within the communication range of the first master/slave device D1. FIG. 20C shows a time chart of carrier sensing 50 and 52 at the reception frequency $f_1$, processing for reception 54 of a received RF signal at the reception frequency $f_1$, a receive ready state 46 at the reception frequency $f_2$, and further processing for reception 48 of a received RF signal at the reception frequency $f_2$, in the first slave/master device D1.

FIG. 20D shows a time chart of the mode of operation (S2, M2) of the second slave/master device D2. FIG. 20E shows a time chart of processing for transmission 56 of an RF signal at the transmission frequency $f_2$ carrying a response containing the lower priority (e.g., 2), and further processing for transmission 42 of an RF signal at the transmission frequency $f_1$ carrying data, such as the request command, in the second slave/master device D2, where the first slave/master device D1 with the higher priority (e.g., 1) is located within the communication range of the second slave/master device D2. FIG. 20F shows a time chart of carrier sensing 50 and 52 at the reception frequency $f_1$, processing for reception 54 of a received RF signal at the reception frequency $f_1$, a receive ready state 46 at the reception frequency $f_2$, and further processing for reception 48 of a received RF signal at the reception frequency $f_2$, in the second slave/master device D2.

FIG. 20G shows a time chart of the master mode of operation M0 of the master device D0. FIG. 20H shows a time chart of processing for transmission 42 of an RF signal at the transmission frequency $f_1$ carrying data, such as the tag ID request command, in the master device D0. FIG. 20I shows a time chart of a receive ready state 46 at the reception frequency $f_2$ and processing for reception 48 of a received RF signal at the reception frequency $f_2$, in the master device D0.

In FIGS. 20A-20C, the device D1 first operates in the master mode of operation M1 in the period Tm which corresponds to the period Tm in the last portion of FIGS. 19A-19C on the right side. In FIGS. 20D-20F, the device D2 first operates in the slave mode of operation S2 in the last portion of FIGS. 19D-19F on the right side. In the sleep period of time Tb occurring after the processing for transmission 42 in the period of time Tt, the transmitter unit 230 of the device D1 is disabled by the control unit 210. During the sleep period of time Tb, the master device D0 appears within the communication ranges of the devices D1 and D2. Then, the transmitter unit (TX) 330 of the device D0 performs the processing for transmission 42 of an RF signal at the frequency $f_1$ as shown in FIG. 20H. The processing for transmission 42 having the predetermined period of time Tt is repeated in a plurality of the predetermined periods of time Tt with the intervening sleep periods of a predetermined period of time Tb.

In the slave mode of operation S2 in the device D2, the receiver unit (RX) 250 receives an RF signal at the frequency $f_1$ from the master device D0 in the carrier sensing period 52, and then the carrier determination unit 246 detects a carrier of the RF signal at the frequency $f_1$ from the device D0 (DT). Subsequently, in the processing for reception 54, the receiver unit 250 receives and demodulates the RF signal, and thereby generates encoded data containing data, such as the request command. Further, the data decoding unit 240 decodes the encoded data in accordance with the predetermined encoding scheme, thereby reproduces non-encoded data, such as the request command, the tag ID and the priority, and then provides the reproduced data to the control unit 210. Thus, the control unit 210 of the device D2 determines that the priority of the device D2 is lower than that of the device D0. In response to the request command, in the device D2, the control unit 210 performs the processing for transmission 56 at a time period or slot selected at random within the predetermined period of time, while the data generation unit 220 generates response data containing data, such as the tag ID and the priority retrieved from the memory 214, and then encodes the response data in accordance with the predetermined encoding scheme. Then, the transmitter unit 230 modulates the carrier with the encoded response data containing the tag ID and the like, and thereby transmits an RF response signal at the transmission frequency $f_2$. The receiver unit 250 of the device D0 performs the processing for reception 48 of a received RF signal at the frequency $f_2$.

In the device D1, in the second period Tt of the processing for transmission 42 after the sleep period Tb, the transmitter unit 230 is enabled by the control unit 210, and then performs the processing for transmission 42 of an RF signal at the transmission frequency $f_1$ carrying data, such as the request command. In response to the carrier detection in the carrier sensing 52, the receiver unit 250 of the device D2 performs the processing for reception 54 of an RF signal at the frequency $f_1$ from the device D0, and then performs the processing for transmission 56 of a received RF signal at the frequency $f_2$. The receiver unit 250 of the device D1 performs the processing for reception 48 of an RF signal at the frequency $f_2$ from the device D2. After that, the device D1 goes to and maintains the slave mode of operation S1 possibly for the scheduled period of time Ts.

In the period Ts in the slave mode of operation S1, in the device D1, the receiver unit 250 performs carrier sensing in the carrier sensing period 52, detects a carrier, and then receives an RF signal at the frequency $f_1$ from the device D0 in the period of the processing for reception 54. In the processing for reception 54, the receiver unit 250 of the device D1 receives and demodulates the RF signal, and thereby generates encoded data containing data, such as the request command. Further, the data decoding unit 240 of the device D1 decodes the encoded data in accordance with the predetermined encoding scheme, thereby reproduces data, such as the request command, the tag ID and the priority, and then provides the reproduced data to the control unit 210. Thus, the control unit 210 of the device D1 determines that the priority of the device D1 is lower than that of the master device D0. In response to the request command from the device D0, in the device D2, the control unit 210 performs the processing for transmission 56 at a time period or slot selected at random within the predetermined period of time, while the data generation unit 220 generates response data containing data, such as the tag ID and the priority retrieved from the memory 214, and then encodes the response data in accordance with the predetermined encoding scheme. Then, the transmitter unit 230 of the device D2 modulates the carrier with the encoded response data containing the tag ID and the like, and thereby transmits an RF response signal at the transmission frequency $f_2$. Each of the devices D1 and D2 operates in the slave mode of operation S1 or S2, until the presence (system ID) of the master device D0 becomes undetectable for a length of time longer than a predetermined period of time Td.

Figure 21A:
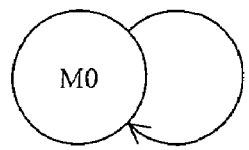
FIG. 21A shows a state transition diagram of a master device.

FIG. 21A shows a state transition diagram of a master device D0. The master device D0 operates permanently in the master mode of operation M0.

Figure 21B:
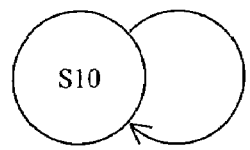
FIG. 21B shows a state transition diagram of a slave device.

FIG. 21B shows a state transition diagram of a slave device D10. The slave device D10 operates permanently in the slave mode of operation S.

Figure 22:
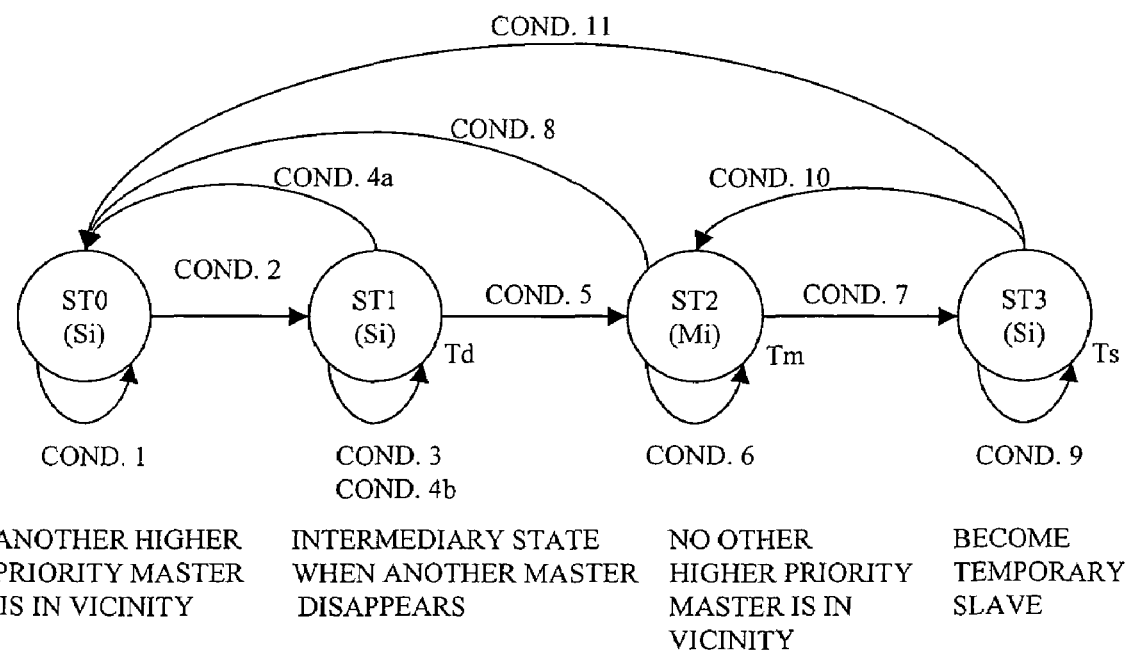
FIG. 22 shows a state transition diagram of each of the slave/master devices.

FIG. 22 shows a state transition diagram of each of slave/master devices D1-D9. FIG. 23 shows the defined conditions in states ST0-ST3 in FIG. 22. Each of the slave/master devices D1-D9 takes states of three different slave modes of operation S and one master mode of operation M.

In FIG. 22, the state ST0 (Si) indicates a state of each of the devices D1-D9 or Di operating in a slave mode of operation Si (i=1, 2, or 9) with a priority i in the initial state of that device Di, and occurs when another device Dj operating in a master mode of operation Mj having a priority j (j<i) higher than that (i) of that device Di is located near that device Di. The state ST1 (Si) indicates a temporary, intermediate state having a period of time Td, which occurs when another device Dj operating in the master mode of operation Mj having the priority j higher than that of the device Di disappears near the device Di. The period of time Td is longer than the length of a few carrier sensing cycles Tcs, and may be, for example, a particular value between 5 and 10 seconds inclusive. Td is typically the value of a sum, Td0+Rnd, of a fixed value Td0 and a random value Rnd, where Rnd is a random variable value, for example, of 0.1-1 second. Introduction of the random value Rnd reduces the probability of collisions between RF signals transmitted by the devices.

The state ST2 (Mi) indicates a state of each of the device D1-D9 or Di operating in a master mode of operation Mi in the period of time Tm, when no other device Dj operating in the master mode of operation Mj having a priority j higher than that of the device Di is located near that device Di. The period of time Tm is longer than the length of a few carrier sensing cycles Tcs and, preferably, shorter than or equal to the period of time Td. The period of time Tm may be, for example, a particular value between 1 and 5 seconds inclusive. Tm is typically the value of a sum, Tm0+Snd, of a fixed value Tm0 and a random value Rnd, where Rnd is a random variable, for example, of 0.1-1 second. The state ST3 (Si) indicates a state of the device D1-D9 operating in the slave mode of operation Si in the period of time Ts after the period Tm, while no other device Dj operating in the master mode of operation Mj having a priority j higher than that of the device Di is located near that device Di. The period of time Ts is longer than the length of a few carrier sensing cycles Tcs and, preferably, shorter than or equal to the period of time Td. The period of time Ts may be, for example, a particular value between 1 and 5 seconds inclusive. Ts is typically the value of a sum, Ts0+Rnd, of a fixed value Ts0 and a random value Rnd. The carrier sensing cycle Tcs is shorter than each of the periods of time Tm and Ts and is, for example, 0.5 seconds. The period of time Tm is preferably shorter than the period of time Ts. The period of time Td is equal to or longer than each of the periods of time Tm and Ts.

With reference to FIGS. 22 and 23, in the state ST0 (Si) of each of the devices D1-D9 or Di, when the condition 1 "It detects another device Dj operating in a master mode of operation Mj having a priority j higher than its own priority i, in the vicinity." is satisfied, that device Di continues to stay in the state ST0. In the state ST0 (Si) of each device Di, when the condition 2 "The condition 1 is not satisfied." is satisfied, i.e., when that device Di does not detect such another device Dj, that device Di goes to the state ST1 (Si). In this condition 2 in that device Di, the alarm unit 276 may generate an audible alarm 1 indicating that no other device operating in a master mode of operation Mj is located in the vicinity.

In the state ST1 (Si) of each of the devices D1-D9 or Di, when the condition 3 "It is within a period of time Td after condition 1 has been satisfied." is satisfied, that device Di continues to stay in the state ST1. In state ST1 (Si) of each device Di, when the condition 4a "It detects another device Dj operating in a master mode of operation Mj with a higher priority j is located in the vicinity." is satisfied, that device Di returns to state ST0 (Si). In the state ST1 (Si) of each device Di, when the condition 4b "It detects that another device Di operating in a master mode of operation Mi with the same priority i is located in the vicinity." is satisfied, that device Di continues to stay in the state ST1 (Si) by extending the period of time Td by a predetermined period of time Td' (Td'<Td). In the state ST1 (Si) of each device Di, when the condition 5 "Until the period of time Td elapses after condition 2 has been satisfied, it detects no other device operating in a master mode of operation Mj with a higher or the same priority j." is satisfied, that device Di goes to the state ST2 (Si). In the state ST1 (Si), even when that device Di detects another device operating in a master mode of operation Mj having a priority lower than its own priority i in the vicinity, that device Di may wait until the condition 5 is satisfied. In this case, the operation of the other device may satisfy the condition 8 of FIG. 23 in the state ST2, and hence may go back to the slave mode of operation in state ST0.

In the state ST2 (Mi) of each of the devices D1-D9 or Di, when the condition 6 "It is within a period of time Tm after condition 5 has been satisfied." is satisfied, that device Di continues to stay in the state ST2. In the state ST2 (Mi), when the condition 7 "A period of time Tm has been elapsed since the condition 5 was satisfied." is satisfied, that device Di goes to the state ST3 (Si). In the state ST2 (Si), when the condition 8 "It detects a device Dj operating in a slave mode of operation Sj having a priority higher than or the same as its own priority i." is satisfied, that device Di goes back to the state ST0 (Si).

In the state ST3 (Si) of each of the devices D1-D9 or Di, when condition 9 "It is within a period of time Ts after condition 7 has been satisfied." is satisfied, that device Di continues to stay in state ST3. In the state ST3 (Si) of each device Di, when the condition 10 "It detects no other device operating in a master mode of operation Mj having a priority j higher than or the same as its own priority i until a period of time Ts elapses." is satisfied, that device Di goes back to the state ST2 (Si). In the state ST3 (Si) of each device Di, when the condition 11 "It detects another device operating in a master mode of operation Mj having a priority j higher than or the same as its own priority i before a period of time Ts elapses." is satisfied, that device Di goes back to the initial state ST0 (Si). In the condition 11, in that device Di, the alarm unit 276 may generate an audible alarm 3 indicating that another device Dj operating in a master mode of operation Mj is located in the vicinity.

FIGS. 24A-24D shows a time chart of the operation modes of a plurality of devices D0-D3, where the devices D0-D3 including two slave/master devices D1 and D2 with the same priority 1 are located within the mutual communication ranges.

In FIGS. 24A-24D, the master device D0 and the slave/master devices D1-D3 are first located in the mutual communication ranges, while the master device D0 operates in the master mode of operation M0. Further, each of the slave/master devices D1 and D2 operates in the slave mode of operation S1, while the slave/master device D3 operates in the slave mode of operation S2. The master device D0 has a priority 0 (zero). Each of the slave/master devices D1 and D2 has a priority 1 (one). The device D3 has a priority 2 which is lower than those of the devices D0, D1 and D2.

The master device D0 disappears at a timing td. Since the timing td, a period of time Td=Td0+Rnd has elapsed in the device D3, so that the device D3 first goes to the master mode of operation M2. The device D3 operates in the master mode of operation M2 in the period of time Tm, and thereby detects the presence of the other devices D1 and D2 with the higher priority. When the device D3 detects the presences of the devices D1 and D2, the device D3 may go to the slave mode of operation S2. When the period of time Td has elapsed in each of the other devices D1 and D2 since the timing td, that device D1 or D2 may go to the master mode of operation, because the device D3 with the lower priority operates in the master mode of operation M2 in the period Tm. Alternatively, if the device D3 with the lower priority operates in the master mode of operation M2 when the period of time Td has elapsed in the devices D1 and D2 since the timing td, each of the other devices D1 and D2 may delay changing its operation mode to the master mode of operation.

Then, the device D3 goes to the slave mode of operation S2 in the state ST3 (Si) after the predetermined period of time Tm. When the period of time Td has elapsed in the state ST1 (Si) in the device D2 possibly in a variable period of time Tx since the device D3 changed its operation mode to the slave mode of operation S2, the device D2 goes to a master mode of operation M1, because no other device operating in the master mode of operation M with a higher or the same priority is located in the vicinity. The device D3 then goes back to the further slave mode of operation S2 in the state ST0 (Si) when a period of time Tx has elapsed in the state ST3 (Si), where Tx indicates the elapsed time until the condition 11 "It detects another device Dj operating in a master mode of operation Mj and having a priority j higher than or the same as its own priority i." is satisfied in the state ST3 (Si) in FIG. 22. The device D2 operates in the master mode of operation M1 in the next period Tm, and thereby detects the presence of the other device D1 with the same priority. The other device D1 does not go to a master mode of operation M1 even after the period of time Td has elapsed in the state ST1 (Si) in the device D1, because the device D2 operating in the master mode of operation M1 with the same priority is located in the vicinity in the period Tm.

Then, the device D2 goes to the slave mode of operation S1 in the state ST3 (Si) after the period of time Tm. The device D2 maintains the slave mode of operation until the period of time Ts elapses, i.e., waits in the slave mode of operation S1 to receive an RF signal at the frequency $f_1$ carrying the tag ID request command from the other device D1. Then, the condition 5 "It detects no other device operating in a master mode of operation Mj with a higher or the same priority j." is satisfied in the state ST1 (Si) in the device D1, and hence the device D1 goes to the master mode of operation M1. The device D1 changes its operation mode to the master mode of operation M1, for example, when a period of time Tx (Tx<Ts) has elapsed since the device D2 changed its operation mode to the slave mode of operation S1. The device D1 operates in the master mode of operation M1 in the next period Tm, and thereby detects the presence of the other device D2 with the same priority as that of the device D1. The other devices D2 and D3 continue to operate in the slave modes of devices D2 and D3 continue to operate in the slave modes of operation, because the device D1 operating in the master mode of operation M1 is located in the vicinity in the period Tm.

Then, the device D1 goes to the slave mode of operation S1 in the state ST3 (Si) after the period of time Tm. The device D1 maintains the slave mode of operation until the period of time Ts elapses, i.e., waits in the slave mode of operation S1 to receive an RF signal at the frequency $f_1$ carrying the tag ID request signal from the other device D2. The device D2 goes to the master mode of operation M1, because the condition 5 "It detects no other device operating in a master mode of operation Mj with a higher or the same priority j." is satisfied in the state ST1 (Si) in the device D2. The device D2 changes its operation mode to the master mode of operation M1, for example, when a period of time Tx (Tx<Ts) has elapsed since the device D1 changed its operation mode to the slave mode of operation S1. The device D2 operates in the master mode of operation M1 in the next period Tm, and thereby detects the presence of the other device D1 with the same priority as that of the device D2. The other devices D1 and D3 continue to operate in the slave mode of operation, because the device D2 operating in the master mode of operation M1 is located in the vicinity in the period Tm. In this manner, the devices D1 and D2 with the same priority operate alternately in the master mode of operation M1.

Although the invention has been described in connection with application to the RF ID tags, it should be understood by those skilled in the art that the invention is not limited to this application and is also applicable to contactless IC cards.

The above-described embodiments are only typical examples, and their combination, modifications and variations are apparent to those skilled in the art. It should be noted that those skilled in the art can make without departing from the principle of the invention and the accompanying claims.

What is claimed is:

1. An information access system for accessing information stored in a contactless information storage device, comprising:
   a first active-type contactless information storage device having a first memory, a first control unit, a first receiver unit adapted to sense a carrier of an RF signal at a first frequency for detection in a slave mode of operation and to be continuously ready to receive an RF signal at a second frequency different from the first frequency in a master mode of operation, and a first transmitter unit for transmitting a response signal at the second frequency in response to reception of an information request signal in the slave mode of operation and for cyclically transmitting an information request signal at the first frequency in a transmission period and then going to an inactive state in a sleep period in the master mode of operation, under the control of the first control unit;
   a reader/writer device operating as a master and having a second memory, a second control unit, a second transmitter unit for cyclically transmitting an information request signal at the first frequency in a transmission period and then going into an inactive state in a sleep period, under the control of the second control unit, and a second receiver unit adapted to be continuously ready to receive an RF signal at the second frequency; and
   a second active-type contactless information storage device having a third memory, a third control unit, a third receiver unit adapted to sense a carrier of an RF signal at the first frequency for detection in a slave mode of operation, and a third transmitter unit for transmitting a response signal at the second frequency in response to receipt of an information request signal in the slave mode of operation, wherein
   in the slave mode of operation,
   the first control unit of the first active-type contactless information storage device controls the first receiver unit to sense a carrier of an RF signal at the first frequency in given periods occurring in a given cycle which is shorter than each of the transmission period and the sleep period,
   when the first receiver unit senses and detects a carrier of an RF signal at the first frequency in a particular given period, the first control unit causes the first receiver unit to further receive an information request signal, and
   the first control unit causes the first transmitter unit to transmit a response signal at the second frequency that carries information stored in the first memory in response to the information request signal, and wherein in the slave mode of operation, in carrier sensing, the first control unit causes the first receiver unit to be in an active state and the first transmitter unit to be in an inactive state in the particular given period, when the first receiver unit attempts to sense a carrier of an RF signal at the first frequency in the particular given period but detects no carrier, the first control unit controls the first receiver unit and the first transmitter unit to remain in an inactive state in a non-carrier-sensing period between the particular given period for carrier sensing and the given period for subsequent carrier sensing, and the first control unit causes the first transmitter unit and the first receiver unit to go into the master mode of operation, when the first receiver unit receives no information request signal in a first period of time longer than a plurality of the given periods.

2. An information access system according to claim 1, wherein the first control unit of the first active-type contactless information storage device is adapted to cause the first transmitter unit to cyclically transmit an information request signal at the first frequency in a plurality of the transmission periods with intervening sleep periods in the master mode of operation, and when a second period of time elapses in the master mode of operation, the first control unit causes the first transmitter unit and the first receiver unit to go into the slave mode of operation.

3. An information access system according to claim 1, wherein in the second active-type contactless information storage device, the third receiver unit is further adapted to be continuously ready to receive an RF signal at the second frequency in a master mode of operation, and the third transmitter unit further transmits cyclically an information request signal at the first frequency in a transmission period and goes into an inactive state in a sleep period in the master mode of operation, under the control of the third control unit.

4. An information access system according to claim 3, wherein the first control unit of the first active-type contactless information storage device is adapted to cause the first transmitter unit to cyclically transmit an information request signal at the first frequency in a plurality of the transmission periods with intervening sleep periods in the master mode of operation, and when a second period of time elapses in the master mode of operation, the first control unit causes the first transmitter unit and the first receiver unit to go into the slave mode of operation.

5. An information access system according to claim 4, wherein the first memory stores information indicating identification and a priority of the first active-type contactless information storage device, the second memory stores information indicating identification and a priority of the reader/writer device, and the third memory stores information indicating identification and a priority of the second active-type contactless information storage device, and wherein after the first control unit of the first active-type contactless information storage device causes the first transmitter unit and the first receiver unit to go into the slave mode of operation from the master mode operation, the first control unit causes the first transmitter unit and the first receiver unit to go back into the master mode of operation, when the first receiver unit has not received, for a third period of time in the slave mode of operation, no information request signal from another device having a priority higher than that of the first active-type contactless information storage device, and after the first control unit causes the first transmitter unit and the first receiver unit to go into the slave mode of operation from the master mode operation, the first control unit causes the first transmitter unit and the first receiver unit to maintain the slave mode of operation, when the first receiver unit receives, during the third period of time in the slave mode of operation, an information request signal from another device having a priority higher than that of the first active-type contactless information storage device.

6. An information access system according to claim 1, wherein in the second active-type contactless information storage device, the third receiver unit is further adapted to be continuously ready to receive an RF signal at the second frequency in a master mode of operation, and the third transmitter unit further transmits cyclically an information request signal at the first frequency in a transmission period and goes into an inactive state in a sleep period in the master mode of operation, under the control of the third control unit, wherein the first memory stores information indicating identification and a priority of the first active-type contactless information storage device, the second memory stores information indicating identification and a priority of the reader/writer device, and the third memory stores information indicating identification and a priority of the second active-type contactless information storage device, and wherein the first control unit of the first active-type contactless information storage device causes the first transmitter unit to cyclically transmit an information request signal at the first frequency in a plurality of the transmission periods with intervening sleep periods, in the master mode of operation, and the first control unit causes the first transmitter unit and the first receiver unit to go into the slave mode of operation, when the first receiver unit receives, in the master mode of operation, a response signal carrying information containing a priority higher than that of the first active-type contactless information storage device.

7. An information access system according to claim 1, wherein in the second active-type contactless information storage device, the third receiver unit is further adapted to be continuously ready to receive an RF signal at the second frequency in a master mode of operation, and the third transmitter unit further transmits cyclically an information request signal at the first frequency in a transmission period and goes into an inactive state in a sleep period in the master mode of operation, under the control of the third control unit, wherein the first memory stores information indicating identification and a priority of the first active-type contactless information storage device, the second memory stores information indicating identification and a priority of the reader/writer device, and the third memory stores information indicating identification and a priority of the second active-type contactless information storage device, and wherein the first control unit of the first active-type contactless information storage device cause the first transmitter unit to cyclically transmit an information request signal at the second frequency in a plurality of the transmission periods with intervening sleep periods, in the master mode of operation, and when the first receiver unit receives, in the master mode of operation, a response signal carrying information containing the same priority as that of the first active-type contactless information storage device, the first control unit causes the first transmitter unit and the first receiver unit to go into the slave mode of operation from the master mode operation, and maintains the first transmitter unit and the first receiver unit to be in the slave mode of operation until at least a given period of time, during which the first receiver unit may receive an information request signal carrying information containing the same priority, elapses.

8. An active-type contactless information storage device capable of communicating with a reader/writer device and/or another contactless information storage device, the active-type contactless information storage device comprising:

a memory, a control unit, a receiver unit adapted to sense a carrier of an RF signal at a first frequency for detection in a slave mode of operation and to be continuously ready to receive an RF signal at a second frequency different from the first frequency in a master mode of operation, and a transmitter unit for transmitting a response signal at the second frequency in response to reception of an information request signal in the slave mode of operation and for cyclically transmitting an information request signal at the first frequency in a transmission period and then going into an inactive state in a sleep period in the master mode of operation, under the control of the control unit, wherein in the slave mode of operation, the control unit of the active-type contactless information storage device controls the receiver unit to sense a carrier of an RF signal at the first frequency in given periods occurring in a given cycle which is shorter than each of the transmission period and the sleep period, when the receiver unit senses and detects a carrier of an RF signal at the first frequency in a particular given period, the control unit causes the receiver unit to further receive an information request signal, and the control unit causes the transmitter unit to transmit a response signal at the second frequency that carries information stored in the memory in response to the information request signal, and wherein in the slave mode of operation, in carrier sensing, the control unit causes the receiver unit to be in an active state and the transmitter unit to be in an inactive state in the particular given period, when the receiver unit attempts to sense a carrier of an RF signal at the first frequency in the particular given period but detects no carrier, the control unit controls the receiver unit and the transmitter unit to remain in an inactive state in a non-carrier-sensing period between the particular given period for carrier sensing and the given period for subsequent carrier sensing, and the control unit causes the transmitter unit and the receiver unit to go into the master mode of operation, when the receiver unit receives no information request signal in a first period of time longer than a plurality of the given periods.

9. An electronic device comprising the active-type contactless information storage device of claim 8.

10. An article comprising the active-type contactless information storage device of claim 8.

11. An active-type contactless information storage device capable of communicating with a reader/writer device and/or another contactless information storage device, the active-type contactless information storage device comprising:

a memory, a control unit, a switch coupled to the control unit, a receiver unit adapted to sense a carrier of an RF signal at a first frequency for detection in a slave mode of operation and to be continuously ready to receive an RF signal at a second frequency different from the first frequency in a master mode of operation, and a transmitter unit for transmitting a response signal at the second frequency in response to reception of an information request signal in the slave mode of operation and for cyclically transmitting an information request signal at the first frequency in a transmission period and then going into an inactive state in a sleep period in the master mode of operation, under the control of the control unit, wherein in response to activation of the switch, the control unit causes the transmitter unit and the receiver unit to be in the master mode of operation during a time period determined on the basis of the operation of the switch, and then causes the transmitter unit and the receiver unit to go into the slave mode of operation after the determined time period, wherein in the slave mode of operation, the control unit of the active-type contactless information storage device controls the receiver unit to sense a carrier of an RF signal at the first frequency in given periods occurring in a given cycle which is shorter than each of the transmission period and the sleep period, when the receiver unit senses and detects a carrier of an RF signal at the first frequency in a particular given period, the control unit causes the receiver unit to further receive an information request signal, and the control unit causes the transmitter unit to transmit a response signal at the second frequency that carries information stored in the memory in response to the information request signal, and wherein in the slave mode of operation, in carrier sensing, the control unit causes the receiver unit to be in an active state and the transmitter unit to be in an inactive state in the particular given period, and when the receiver unit attempts to sense a carrier of an RF signal at the first frequency in the particular given period but detects no carrier, the control unit controls the receiver unit and the transmitter unit to remain in an inactive state in a non-carrier-sensing period between the particular given period for carrier sensing and the given period for subsequent carrier sensing.

12. An electronic device comprising the active-type contactless information storage device of claim 11.

13. An article comprising the active-type contactless information storage device of claim 11.

14. In an active-type contactless information storage device, a method for communicating with a reader/writer device and/or another contactless information storage device, the active-type contactless information storage device comprising a memory, a control unit, a transmitter unit and a receiver unit, the method comprising:

in a slave mode of operation, with the control unit, causing the receiver unit to sense a carrier of an RF signal at a first frequency for detection and causing the transmitter unit to transmit a response signal at a second frequency different from the first frequency in response to reception of an information request signal, and in a master mode of operation, with the control unit, causing the receiver unit to be continuously ready to receive an RF signal at the second frequency, and causing the transmitter unit to cyclically transmit an information request signal at the first frequency in a transmission period and then go into an inactive state in a sleep period, wherein in the slave mode of operation, controlling the receiver unit to sense a carrier of an RF signal at the first frequency in given periods occurring in a given cycle which is shorter than each of the transmission period and the sleep period, when the receiver unit senses and detects a carrier of an RF signal at the first frequency in a particular given period, causing the receiver unit to further receive an information request signal, and causing the transmitter unit to transmit a response signal at the second frequency that carries information stored in the memory in response to the information request signal, and wherein in the slave mode of operation, in carrier sensing, causing the receiver unit to be in an active state and the transmitter unit to be in an inactive state in the particular given period, when the receiver unit attempts to sense a carrier of an RF signal at the first frequency in the particular given period but detects no carrier, controlling the receiver unit and the transmitter unit to remain in an inactive state in a non-carrier-sensing period between the particular given period for carrier sensing and the given period for subsequent carrier sensing, and causing the transmitter unit and the receiver unit to go into the master mode of operation, when the receiver unit receives no information request signal in a first period of time longer than a plurality of the given periods.

15. A storage medium storing a program for an active-type contactless information storage device and for communicating with a reader/writer device and/or another contactless information storage device, the active-type contactless information storage device comprising a memory, a control unit, a transmitter unit and a receiver unit, the program being operable to causing the control unit to perform the steps of:

in a slave mode of operation, causing the receiver unit to sense a carrier of an RF signal at a first frequency for detection and causing the transmitter unit to transmit a response signal at a second frequency different from the first frequency in response to reception of an information request signal, and in a master mode of operation, causing the receiver unit to be continuously ready to receive an RF signal at the second frequency, and causing the transmitter unit to cyclically transmit an information request signal at the first frequency in a transmission period and then go into an inactive state in a sleep period, wherein in the slave mode of operation, controlling the receiver unit to sense a carrier of an RF signal at the first frequency in given periods occurring in a given cycle which is shorter than each of the transmission period and the sleep period, when the receiver unit senses and detects a carrier of an RF signal at the first frequency in a particular given period, causing the receiver unit to further receive an information request signal, and causing the transmitter unit to transmit a response signal at the second frequency that carries information stored in the memory in response to the information request signal, and wherein in the slave mode of operation, in carrier sensing, causing the receiver unit to be in an active state and the transmitter unit to be in an inactive state in the particular given period, when the receiver unit attempts to sense a carrier of an RF signal at the first frequency in the particular given period but detects no carrier, controlling the receiver unit and the transmitter unit to remain in an inactive state in a non-carrier-sensing period between the particular given period for carrier sensing and the given period for subsequent carrier sensing, and causing the transmitter unit and the receiver unit to go into the master mode of operation, when the receiver unit receives no information request signal in a first period of time longer than a plurality of the given periods.

* * * * *